US012556675B1

(12) United States Patent
Stranges

(10) Patent No.: US 12,556,675 B1
(45) Date of Patent: Feb. 17, 2026

(54) MODULAR PORTABLE SPHERICAL SCANNING SYSTEM

(71) Applicant: Antonio Stranges, Torrance, CA (US)

(72) Inventor: Antonio Stranges, Torrance, CA (US)

(*) Notice: Subject to any disclaimer, the term of this patent is extended or adjusted under 35 U.S.C. 154(b) by 0 days.

(21) Appl. No.: 19/352,967

(22) Filed: Oct. 8, 2025

Related U.S. Application Data

(60) Provisional application No. 63/877,437, filed on Sep. 8, 2025.

(51) Int. Cl.
*H04N 13/243* (2018.01)
*G03B 17/56* (2021.01)
*H04N 13/254* (2018.01)
*H04N 13/296* (2018.01)
*H04N 23/65* (2023.01)

(52) U.S. Cl.
CPC ......... *H04N 13/243* (2018.05); *G03B 17/561* (2013.01); *G03B 17/566* (2013.01); *H04N 13/254* (2018.05); *H04N 13/296* (2018.05); *H04N 23/65* (2023.01)

(58) Field of Classification Search
CPC .. H04N 13/243; H04N 13/254; H04N 13/296; H04N 23/65; G03B 17/561; G03B 17/566
USPC .......................................................... 348/47
See application file for complete search history.

(56) References Cited

U.S. PATENT DOCUMENTS

| | | | | |
|---|---|---|---|---|
| 4,918,321 A | * | 4/1990 | Klenk | G01N 21/8806 250/559.05 |
| 5,436,726 A | * | 7/1995 | Ventura | G01N 21/8806 356/613 |
| 5,636,024 A | * | 6/1997 | Crookham | G01M 11/005 356/613 |
| 5,726,705 A | * | 3/1998 | Imanishi | G01N 21/8806 356/600 |
| 5,915,132 A | * | 6/1999 | Counts, Jr. | G03B 15/10 396/4 |
| 6,266,138 B1 | * | 7/2001 | Keshavmurthy | G01N 21/88 356/600 |

(Continued)

OTHER PUBLICATIONS canon.co.uk [online], "3D photogrammetry: turning photographs into 3D models," available on or before Oct. 28, 2021, retrieved on Jan. 6, 2026, retrieved from URL<https://www.canon.co.uk/pro/stories/3d-photogrammetry/>, 2 pages.

(Continued)

*Primary Examiner* — Tung T Vo
(74) *Attorney, Agent, or Firm* — Fish & Richardson P.C.

(57) ABSTRACT

A spherical scanning system includes a plurality of rig segments configured to be arranged circumferentially about a central axis and to define an imaging space having a spherical shape, where the rig segments are configured to define at least one entrance to provide access to the imaging space. Each rig segment includes a base platform, a plurality of mounting tracks that extend upward from the base platform and are connected to one another, each mounting track being curved to define a portion of the spherical shape, a plurality of lighting modules disposed at each mounting track, and a plurality of camera modules mounted to each mounting track. The rig segments are configured to be disassembled from one another for transportation.

18 Claims, 20 Drawing Sheets

(56) References Cited

U.S. PATENT DOCUMENTS

| | | | | |
|---|---|---|---|---|
| 6,398,870 | B1* | 6/2002 | Kaya | G01N 21/8851 |
| | | | | 118/712 |
| 6,532,066 | B1* | 3/2003 | Filev | G01N 21/8422 |
| | | | | 356/600 |
| 8,365,580 | B2* | 2/2013 | Stumpf | G01M 17/007 |
| | | | | 73/592 |
| 9,412,203 | B1* | 8/2016 | Garcia, III | G06T 13/00 |
| 10,063,758 | B2* | 8/2018 | Scheich | H04N 23/90 |
| 10,122,997 | B1* | 11/2018 | Sheffield | H04N 13/296 |
| 10,939,023 | B2* | 3/2021 | Scheich | H04N 23/50 |
| 11,674,907 | B2* | 6/2023 | Kasavala | G06T 7/13 |
| | | | | 356/237.2 |
| 11,856,282 | B2* | 12/2023 | Scheich | H04N 13/239 |
| 12,277,585 | B2* | 4/2025 | Garcia, III | G06T 13/80 |
| 12,346,004 | B2* | 7/2025 | Scheich | H04N 23/66 |
| 2002/0085219 | A1* | 7/2002 | Ramamoorthy | H04N 19/61 |
| | | | | 358/1.9 |
| 2002/0190991 | A1* | 12/2002 | Efran | H04N 5/2625 |
| | | | | 345/475 |
| 2004/0246333 | A1* | 12/2004 | Steuart, III | H04N 13/243 |
| | | | | 348/42 |
| 2010/0238290 | A1* | 9/2010 | Riley | H04N 23/50 |
| | | | | 348/148 |
| 2011/0213253 | A1* | 9/2011 | Kruglick | A61B 5/444 |
| | | | | 382/128 |
| 2012/0293632 | A1* | 11/2012 | Yukich | H04N 23/90 |
| | | | | 348/47 |
| 2016/0065798 | A1* | 3/2016 | Evans | G03B 35/04 |
| | | | | 348/50 |
| 2016/0076272 | A1* | 3/2016 | LeMoine | E04H 15/405 |
| | | | | 29/428 |
| 2016/0381257 | A1* | 12/2016 | Kuo | H04N 23/45 |
| | | | | 348/38 |
| 2016/0381261 | A1* | 12/2016 | Bontrager | F16M 11/2021 |
| | | | | 348/375 |
| 2017/0066114 | A1* | 3/2017 | Tofte | B01D 29/96 |
| 2018/0160019 | A1* | 6/2018 | Scheich | G06F 16/51 |
| 2018/0234627 | A1* | 8/2018 | Kim | H04N 23/66 |
| 2018/0302572 | A1* | 10/2018 | Barnes | H04N 23/90 |
| 2018/0332234 | A1* | 11/2018 | Doig | G06F 3/011 |
| 2019/0063918 | A1* | 2/2019 | Hart | G06T 17/05 |
| 2020/0292920 | A1* | 9/2020 | Lin | F16M 11/22 |
| 2023/0041560 | A1* | 2/2023 | Kalra | G01B 11/245 |
| 2023/0182837 | A1* | 6/2023 | Cho | B62D 65/18 |
| | | | | 29/281.1 |
| 2023/0288787 | A1* | 9/2023 | Bliedung Von Der Heide | E04H 3/24 |
| 2024/0009898 | A1* | 1/2024 | Adams | B29C 41/46 |
| 2025/0147389 | A1* | 5/2025 | Mouret | G03B 15/05 |
| 2025/0217858 | A1* | 7/2025 | Garcia, III | H04N 7/181 |
| 2025/0242761 | A1* | 7/2025 | Bozeman | B60R 7/08 |
| 2025/0267351 | A1* | 8/2025 | Scheich | H04N 23/74 |

OTHER PUBLICATIONS

ESPER—Photogrammetry & Multi-Camera Equipment [online], "Mobile 3D Face Scanning Rig—The Avatar Truck," Nov. 14, 2019, retrieved on Jan. 6, 2026, retrieved from URL<https://www.youtube.com/watch?v=S3oeeduFOVI>, 1 page.

Esperhq.com [online], "How ESPER Helped an eCommerce Company Slash Their Scan Time and Boost Productivity," May 29, 2019, retrieved on Jan. 6, 2026, retrieved from URL<https://www.esperhq.com/esper-helped-spinme-slash-scan-time-boost-productivity/>, 1 page.

* cited by examiner

MODULAR PORTABLE SPHERICAL SCANNING SYSTEM

CROSS-REFERENCE TO RELATED APPLICATIONS

This application claims the benefit of priority to U.S. Provisional Application No. 63/877,437, filed on Sep. 8, 2025, the contents of which are hereby incorporated by reference.

TECHNICAL FIELD

This disclosure relates to scanning systems for three-dimensional (3D) and 4D data acquisition, and more specifically to a modular, portable spherical system designed for high-resolution capture of physical subjects, including people, animals, and inanimate objects. The system is adaptable to various scanning purposes, such as digital doubles, artificial intelligence (AI) datasets, volumetric video, photogrammetry, and the accurate reconstruction of physical forms in virtual, augmented, or mixed-reality environments.

BACKGROUND

Scanning systems may be often stationary, bulky, and difficult to transport. Their rigid, non-modular construction may be provided by significant time and labor to set up, calibrate, or relocate, often taking several days to weeks to fully assemble or move between locations. This makes them impractical for dynamic production environments, mobile scanning applications, or field-based data collection.

Additionally, in some cases, their fixed nature limits use to controlled facilities, reducing flexibility for capturing volumetric data in on-location shoots, or being adapted for mobile use cases such as being installed inside a truck or van. These systems may include custom integration of cameras, lighting, synchronization hardware, and support structures, with limited reusability or scalability once deployed.

SUMMARY

The present disclosure describes a compact, modular, and reconfigurable spherical scanning system that can maintain consistent geometric accuracy while allowing rapid deployment, teardown, and transport.

According to one aspect of the subject matter described in this application, a spherical scanning system includes a plurality of rig segments configured to be arranged circumferentially about a central axis and to define an imaging space having a spherical shape, where the plurality of rig segments are configured to define at least one entrance to provide access to the imaging space. Each of the plurality of rig segments includes a base platform, a plurality of mounting tracks that extend upward from the base platform and are connected to one another, each of the plurality of mounting tracks being curved to define a portion of the spherical shape, a plurality of lighting modules disposed at each of the plurality of mounting tracks, and a plurality of camera modules mounted to each of the plurality of mounting tracks. The plurality of rig segments are configured to be disassembled from one another for transportation.

Implementations according to this aspect can include one or more of the following features. For example, each of the plurality of rig segments can further include a power distribution circuit configured to provide power to the plurality of lighting modules and the plurality of camera modules, a camera trigger controller configured to control image capture of the plurality of camera modules, a data storage configured to store image data captured by the plurality of camera modules, and a network interface circuit configured to communicate with power distribution circuit, camera trigger controller, and the data storage.

In some implementations, the spherical scanning system can further include a plurality of connectors configured to couple the plurality of rig segments to one another. For example, the plurality of connectors can include at least one of a toggle clamp or a key-slot coupling.

In some implementations, each of the plurality of mounting tracks define a plurality of rails that are configured to receive the plurality of lighting modules, respectively, and that extend toward the imaging space. In some implementations, the spherical scanning system can further include a lighting panel coupled to at least one of the plurality of the mounting tracks, where the plurality of lighting modules are mounted to the lighting panel. In some examples, the lighting panel can include a hub and a plurality of arms that extend radially outward from the hub, where the plurality of lighting modules are mounted to the hub and end points of the plurality of arms. In some examples, the lighting panel can further include a plurality of connection bars that connect the end points of the plurality of arms, where the plurality of lighting modules are further mounted to (i) each of the plurality of connection bars between the end points of the plurality of arms and (ii) a midpoint of each of the plurality of arms between the hub and one of the end points of the plurality of arms.

In some implementations, the plurality of rig segments can be arranged along geodesic coordinates of the spherical shape. In some examples, each of the plurality of mounting tracks comprises a mounting bracket configured to couple to one of the plurality of camera modules, the mounting bracket defining a rail slot configured to guide movement of the one of the plurality of camera modules based on the one of the plurality of camera modules being mounted to the mounting bracket.

In some implementations, each of the plurality of rig segments can further include a plurality of power cables that are connected to the plurality of lighting modules or the plurality of camera modules, a plurality of data cables that are connected to the plurality of camera modules, and a plurality of cable routing channels configured to cover and guide the plurality of power cables and the plurality of data cables.

In some implementations, the plurality of rig segments can be made of at least one of aluminum, carbon composite materials, or plastics. In some implementations, the spherical scanning system can further include a central synchronization controller configured to coordinate image capture timing and data aggregation of the plurality of camera modules.

In some implementations, each of the plurality of rig segments can further include a polarizer holder that is coupled to at least one of the plurality of mounting tracks, the polarizer holder being disposed at a lens side of one of the plurality of camera modules facing the imaging space, and a polarizer mounted to the polarizer holder and disposed in a preset polarization orientation with respect to a lens axis of each of the plurality of camera modules.

In some implementations, the spherical scanning system can further include a top bracket that couples upper ends of the plurality of mounting tracks to one another. In some implementations, each of the plurality of rig segments can further include at least one bridge that is disposed between an upper end and a lower end of the plurality of mounting tracks and circumferentially connects the plurality of mounting tracks.

In some implementations, the base platform can include an upper plate that supports the plurality of mounting tracks, a base frame disposed below the upper plate, and a toggle clamp disposed at a side surface of the base frame and configured to connect to a base platform of another rig segment of the plurality of rig segments. In some examples, the upper plate can define a plurality of cutouts corresponding to positions of the plurality of mounting tracks. In some examples, the base frame defines a space for accommodating electronic devices. For example, the electronic devices in the base frame can include at least one of (i) a power distribution circuit configured to provide power to the plurality of lighting modules and the plurality of camera modules, (ii) a camera trigger controller configured to control image capture of the plurality of camera modules, (iii) a data storage configured to store image data captured by the plurality of camera modules, or (iv) a network interface circuit configured to communicate with power distribution circuit, camera trigger controller, and the data storage.

In some examples, each of the plurality of mounting tracks can include an inner surface that faces the imaging space, and an outer surface disposed radially outside of the inner surface, the outer surface having (i) a vertical section that extends vertically relative to the base platform and (ii) a curved section that extends upward from the vertical section and is curved radially inward relative to the vertical section.

DETAILED DESCRIPTION

Figure 1:
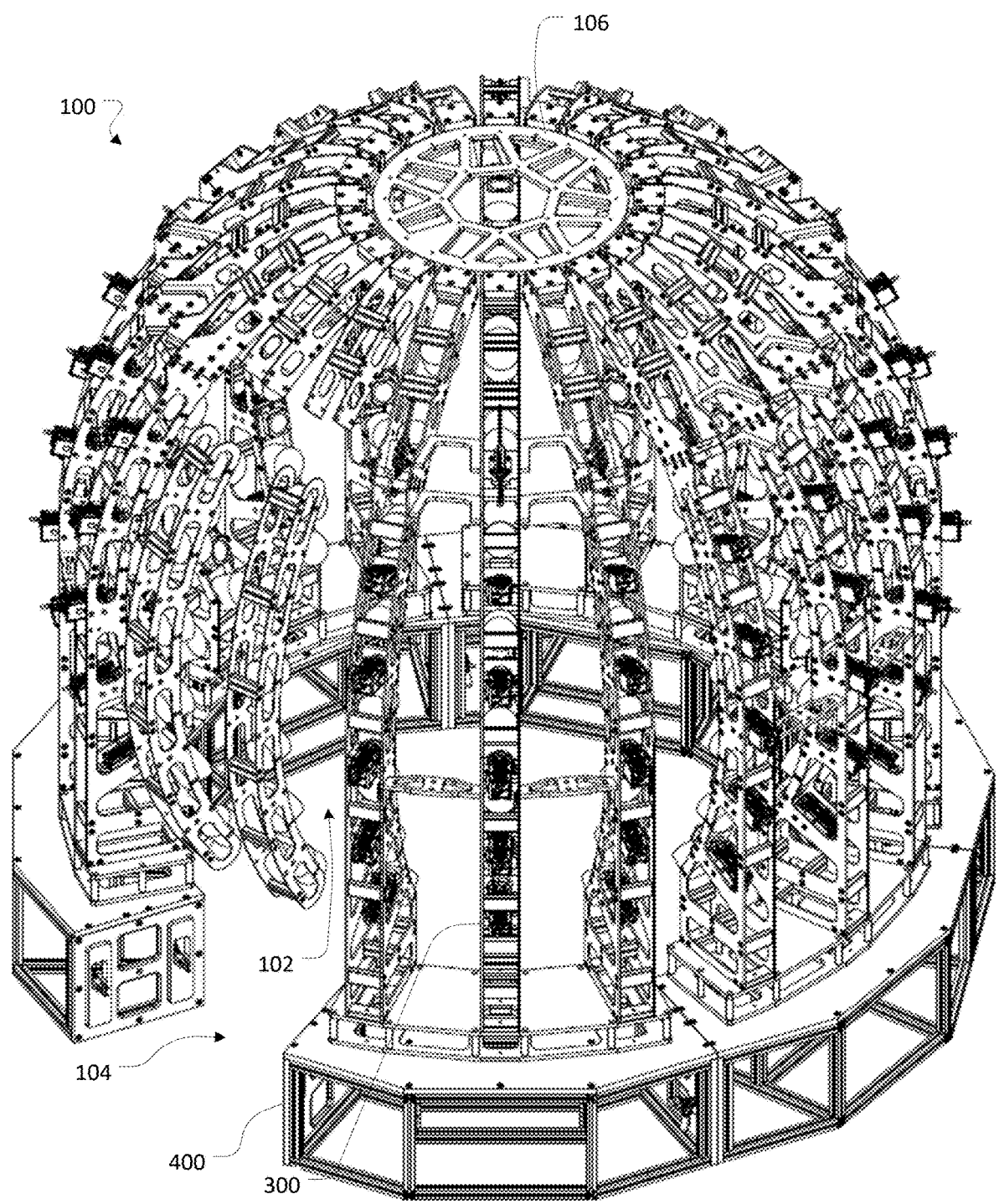
FIG. 1 is a perspective view illustrating an example of a spherical scanning rig including a plurality of rig segments and a plurality of base platforms.

The disclosure describes a portable scanning system ("rig") having a spherical enclosure, formed from modular structural rig segments that can be geodesic or otherwise shaped. The portable scanning system can include panels that are mounted to a base rail and that can be assembled and disassembled for transport.

In some examples, each modular rig segment of the spherical structure can be self-contained, housing its own network interface, power distribution system, local storage unit, and camera triggering mechanism. This decentralized architecture can enable scalable deployment, simplified cabling, and parallel data handling across all rig segments of the rig.

In some implementations, the geometry of the spherical enclosure can determine the placement strategy for lighting modules. For example, in configurations using geodesic-style construction, lighting modules can be affixed directly to structural panels using integrated mounting points aligned with geodesic coordinates. In planar-style configurations, lights can be mounted along internal rail systems that follow the contour of the spherical form. Camera modules can remain mounted to predefined positions on the internal rail system in both configurations, ensuring a consistent and repeatable imaging layout. This allows for identical calibration and alignment procedures across setups, even when the lighting arrangement varies between builds.

The spherical enclosure can be formed from one or more modular rig segments, allowing the system to scale from partial to complete enclosures depending on the use case. When configured as a partial segment of a sphere, the structure can take the form of a spherical lune-a wedge-shaped section of a sphere-suitable for targeted capture setups or restricted field-of-view use cases. The overall structure can be symmetrical around a central axis, ensuring uniform distribution of camera modules and lighting modules, and enabling consistent optical calibration regardless of the number of rig segments assembled.

In some implementations, the scanning system can include a base frame supporting a plurality of modular structural panels that collectively define a spherical shape. These panels may form a full or partial sphere, and in some implementations, may be geodesic in structure for increased rigidity and reduced weight. In some examples, each panel can include integrated mounting tracks for affixing imaging devices and lighting modules. The mounting system allows for precise adjustment and repositioning of hardware using a standardized quick-connect rail system. In some examples, one or more light-emitting diodes (LEDs) or other light sources can be positioned in predefined arrays across the inner surface of the spherical enclosure.

In some implementations, the modular rig segments can be joined using mechanical clamps and key-slot systems, without tools for setup or teardown. In some examples, the entire rig can be transported in a compact form via freight cases.

Reference will now be made in detail to one or more implementations of the present disclosure, examples of which are illustrated in the accompanying drawings.

Figure 2:
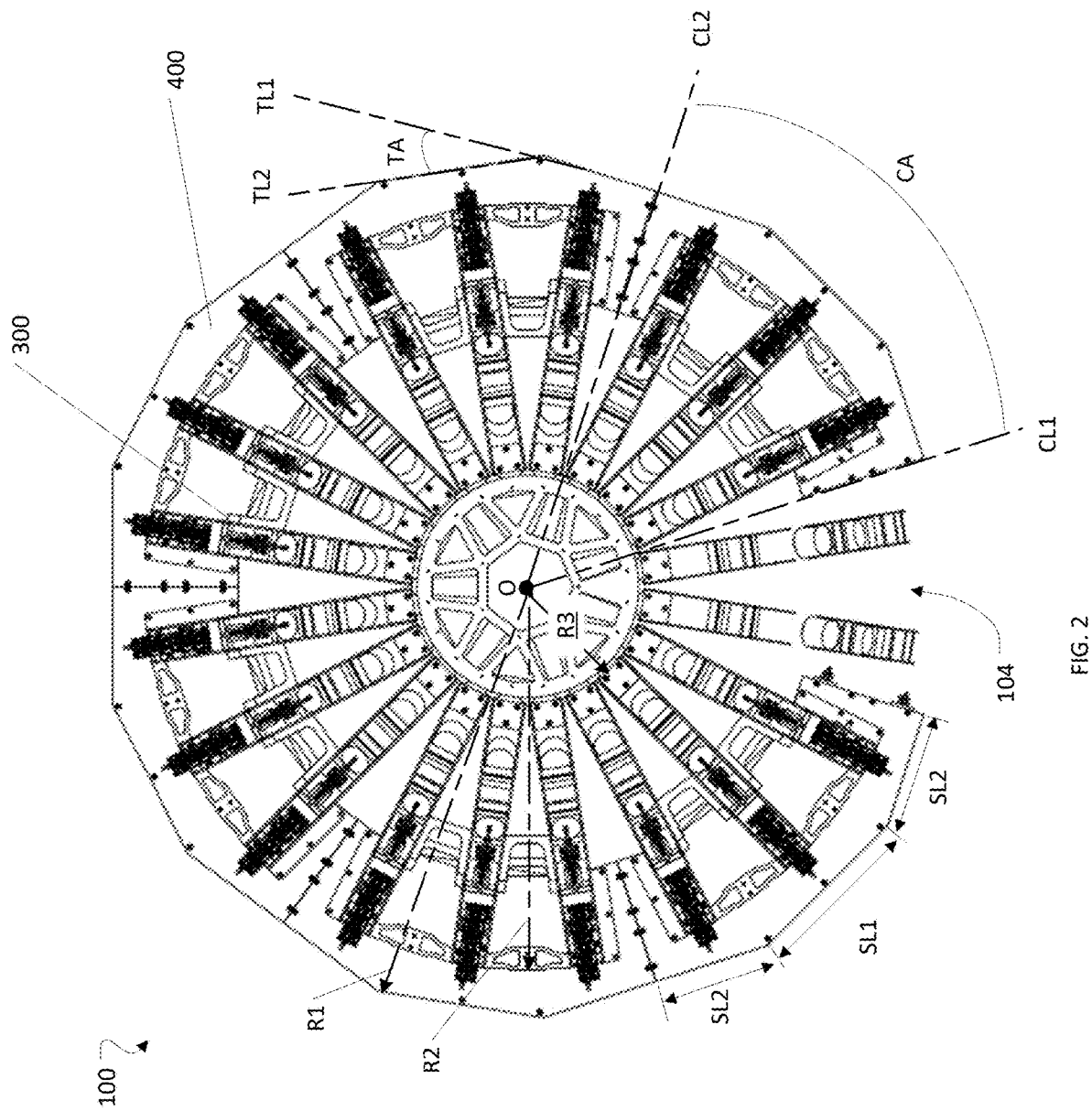
FIG. 2 is a top view illustrating the spherical scanning rig.
Figure 3:
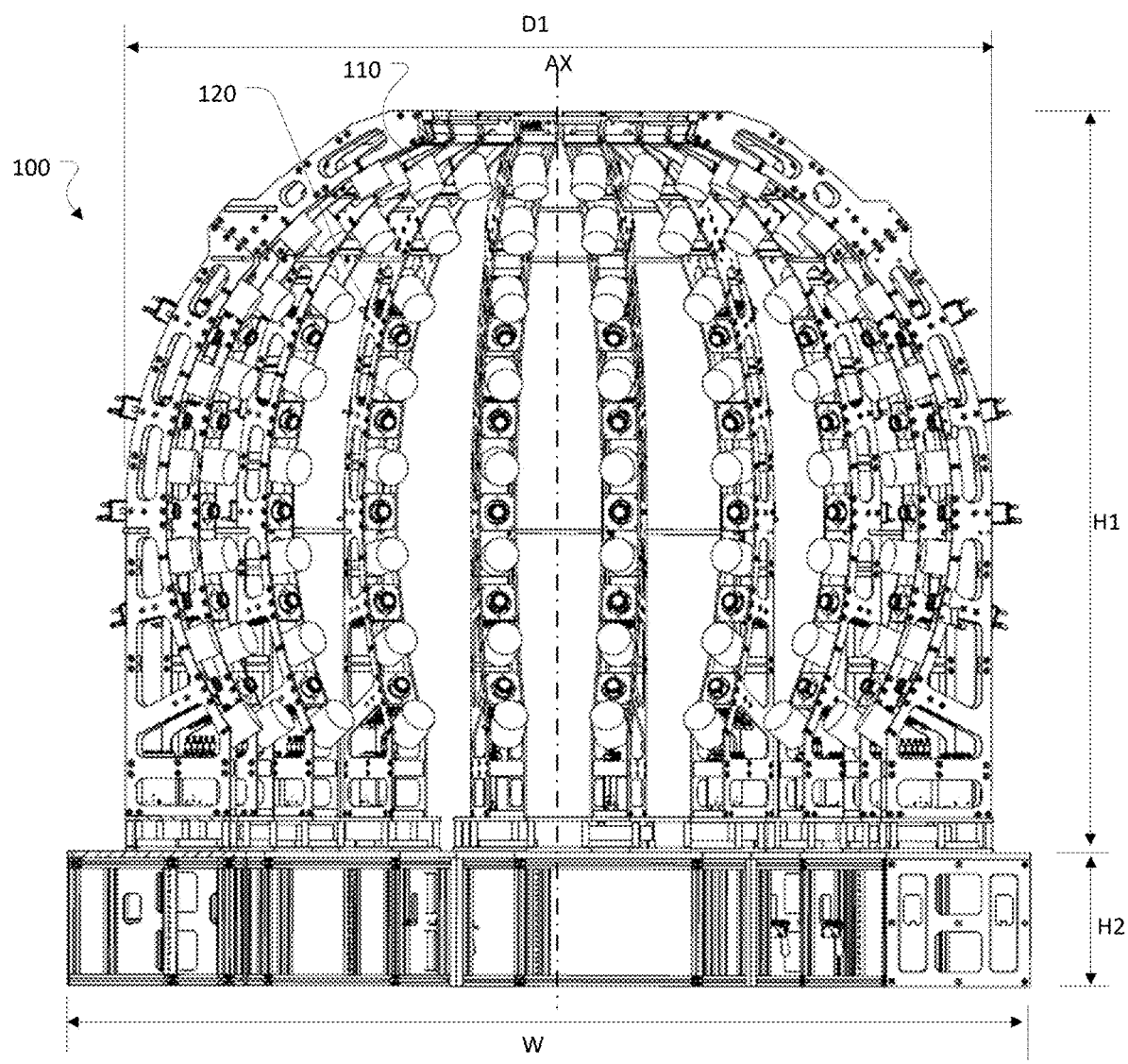
FIG. 3 is a side view illustrating the spherical scanning rig.
Figure 4:
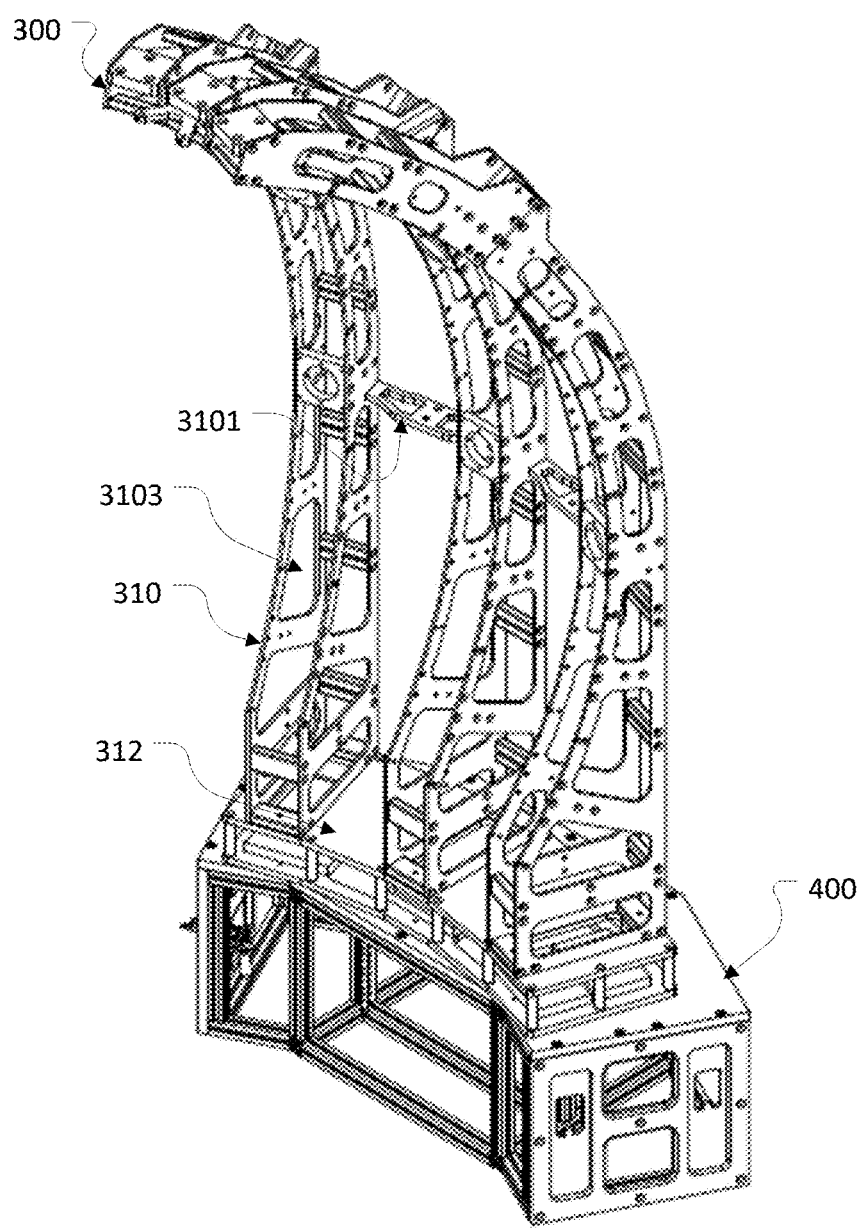
FIG. 4 is a perspective view illustrating an example of one rig segment including three curved mounting tracks and a rig segment base that are disposed on the base platform.

FIG. 1 illustrates an example of a spherical scanning rig including a plurality of rig segments and a plurality of base platforms. FIG. 2 is a top view illustrating the spherical scanning rig. FIG. 3 is a side view illustrating the spherical scanning rig. FIG. 4 illustrates an example of one rig segment including three curved mounting tracks and a rig segment base that are disposed on the base platform.

In some implementations, referring to FIGS. 1-4, a spherical scanning system 100 (or "spherical scanning rig") can include a plurality of rig segments 300 configured to be arranged circumferentially about a central axis AX and to define an imaging space 102 having a spherical shape, where the rig segments 300 are configured to define at least one entrance 104 to provide access to the imaging space. For example, the spherical scanning system 100 can accommodate, in the imaging space 102, physical subjects, including people, animals, and inanimate objects. The plurality of rig segments 300 can be configured to be disassembled from one another for transportation.

In some implementations, each of the plurality of rig segments 300 can further include a base platform 400 that support one or more mounting tracks 310 are disposed. For example, each rig segment 300 can include a plurality of mounting tracks 310 that extend upward from the base platform 400 and are connected to one another, where each of the plurality of mounting tracks 310 is curved to define a portion of the spherical shape of the imaging space 102. In the examples shown in this application, each rig segment 300 includes three mounting tracks 310. In other examples, one rig segment 300 can include one or more (e.g., two) mounting tracks 310 disposed on the base platform 400. In some examples, the mounting tracks 310 can be made of at least one of aluminum, carbon composite materials, or plastics. The plurality of rig segments 300 (e.g., the mounting tracks 310) can be arranged along geodesic coordinates of the spherical shape.

The spherical scanning system 100 can further include a top bracket 106 that couples upper ends of the mounting tracks 310 to one another. For example, the top bracket 106 has a circular shape having cutouts in the middle. In some examples, the top bracket 106 can have other shapes, such as a star shape with radial arms, which can connect the upper ends of the mounting tracks 310 to one another. The upper ends of the mounting tracks 310 can be circumferentially arranged about the central axis AX and coupled to an outer rim of the top bracket 106 via fastening members such as bolts and screws.

In some implementations, each of the plurality of rig segments can further include a plurality of lighting modules 110 disposed at each of the plurality of mounting tracks 310, and a plurality of camera modules 120 mounted to each of the plurality of mounting tracks 310. For example, the plurality of lighting modules 110 can include various light sources such as one or more LEDs and light mounting brackets. For example, the plurality of camera modules 120 can include various camera platforms such as digital single-lens reflex (DSLR) cameras, machine vision cameras, and professional cinema cameras. The plurality of camera modules 120 can also include camera mounting brackets.

Referring to FIG. 2, the base platforms 400 are circumferentially arranged about a center point O through which the central axis AX extends. For example, each base platform 400 defines a segment angle CA, defined between sidewalls CL1 and CL2 of the base platform 400. The segment angle CA depends on the number of the rig segments arranged about the center point O. For instance, the segment angle CA can be 18 degrees to 90 degrees.

In some examples, the base platform 400 can have an angular outer circumference. For instance, as shown in FIG. 2, the outer circumference of the base platform 400 has three flat surfaces having lengths SL1 and SL2 and a tangential angle TA between tangential lines TL1 and TL2. In some cases, SL1 can be greater than or equal to SL2. The tangential angle TA can be less than the segment angle CA. The base platform 400 can define an outer radius R1 of the spherical scanning system 100, and the top bracket 106 can define an inner radius R3 of the spherical scanning system 100. An outer circumference of the mounting tracks 310 can define a radius R2 between the outer radius R1 and the inner radius R3. For example, R1 can be in a range of 30" to 65", R2 can be in a range of 25" to 60", and R3 can be in a range 8" to 40".

In some examples, the base platform 400 can have a round, circular outer circumference without TL1, TL2, SL1, and SL2 being defined.

In some examples, a vertical height H1 of the rig segments 300 from the base platform 400 to the top bracket 106 can be in a range of 60" to 110", and a vertical height H2 of the base platform 400 can be in a range 12" to 24". A width W of the base platform 400 can be twice the outer radius R1.

Figure 5:
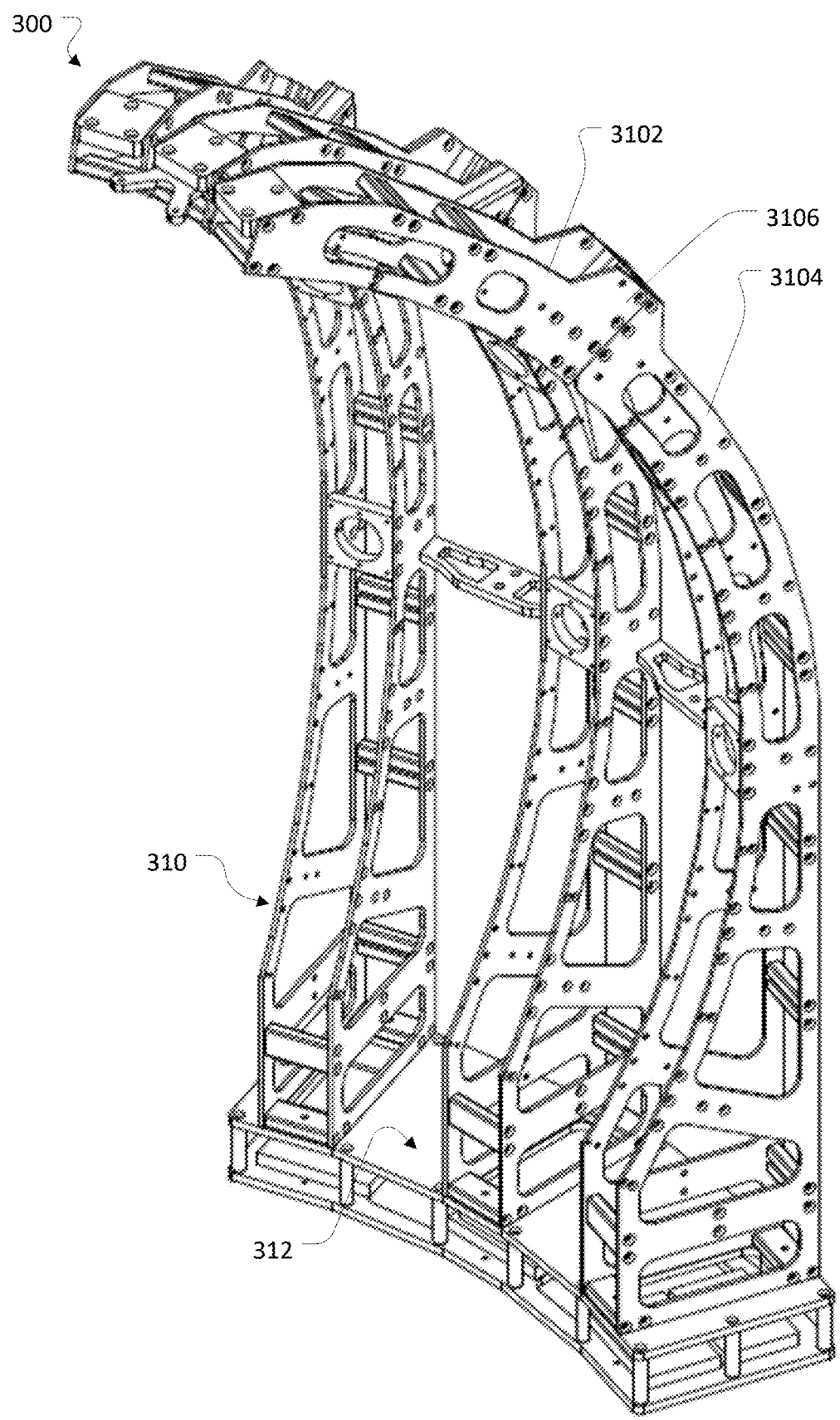
FIG. 5 is a perspective view illustrating the curved mounting tracks on the rig segment base.

FIG. 5 illustrates the curved mounting tracks 310 disposed on a rig segment base 312.

Referring to FIGS. 4 and 5, each rig segment 300 can include at least one bridge 3101 that is disposed between an upper end and a lower end of the rig segment 300 and circumferentially connects the mounting tracks 310 of the rig segment 300. Each mounting track 310 can include a plurality of cutouts 3103, with various shapes arranged along the mounting track 310. Each rig segment 300 can further include the rig segment base 312 (sub-base rig segment) disposed between the base platform 400 and the mounting tracks 310.

Each mounting track 310 can include an upper rig segment 3102 and a lower rig segment 3104 that are coupled to each other at a coupling portion 3106. For instance, the coupling portion 3106 can include a top surface of the lower rig segment 3104 and a bottom surface of the upper rig segment 3102 that include precision-machined keyways. For example, a male geometry can be provided on the bottom surface of the upper rig segment 3102, and a corresponding negative (female) recess 3108 can be provided on the top surface of the lower rig segment 3104 (see FIG. 6). These keyways ensure accurate alignment and structural rigidity. Once seated, the upper and lower rig segments can be mechanically fastened using vertical toggle clamps, which are positioned to engage both sides of the keyway interface. This allows the rig segments to be securely locked together without the need for tools, facilitating rapid assembly and disassembly in the field.

Figure 6:
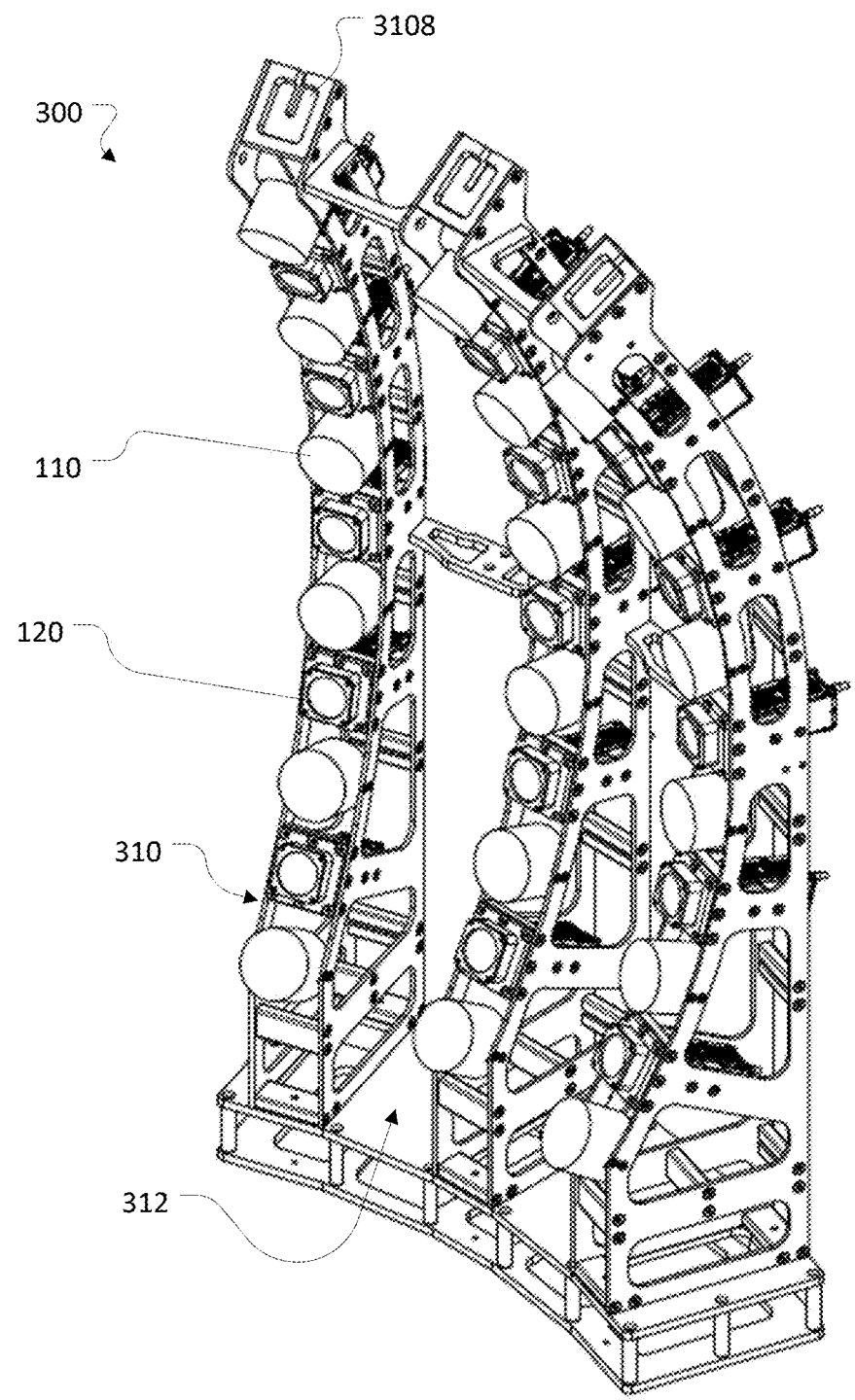
FIG. 6 is a perspective view illustrating an example of lighting modules and cameras that are mounted to the mounting tracks.
Figure 7A:
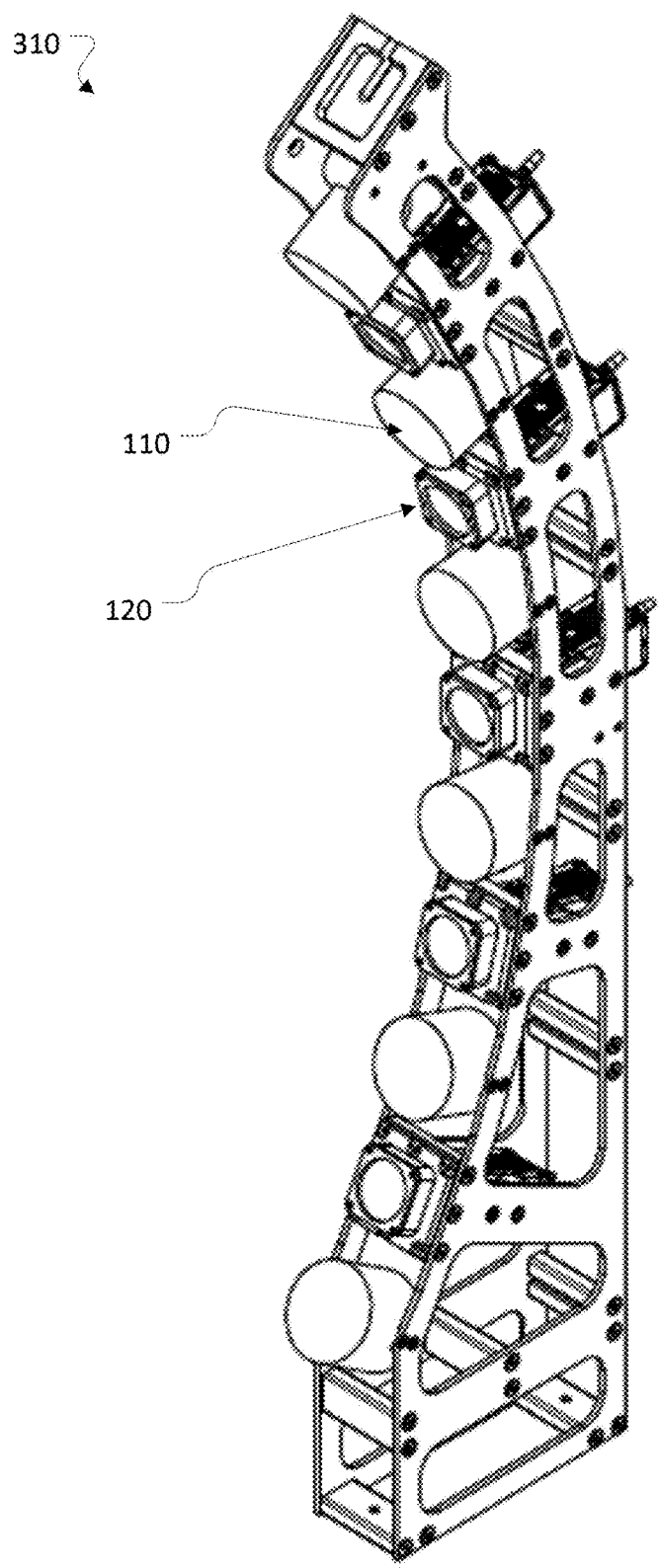
FIG. 7A is a perspective view illustrating an example of a single mounting track including lighting modules and camera modules.
Figure 7B:
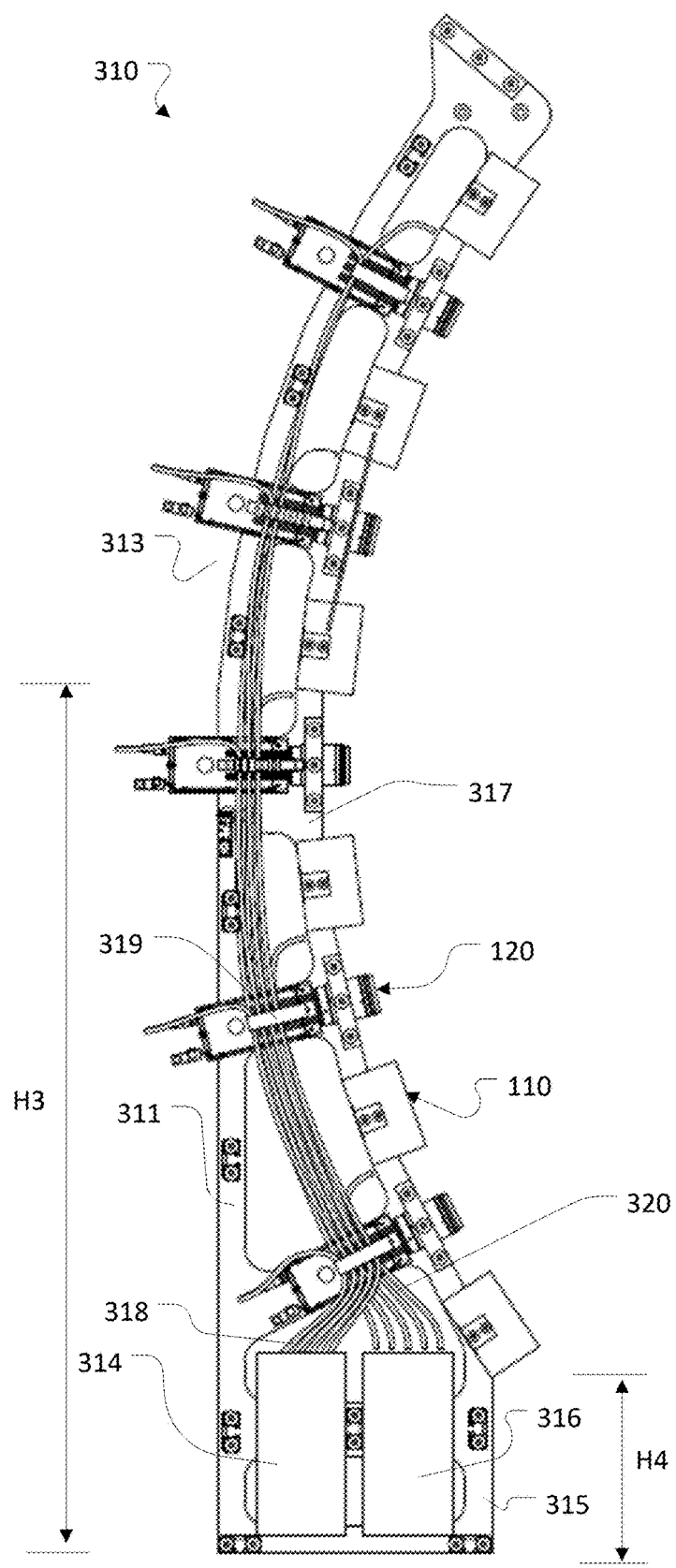
FIG. 7B is a side view illustrating the single mounting track and an example arrangement of cables and circuit boards.
Figure 7C:
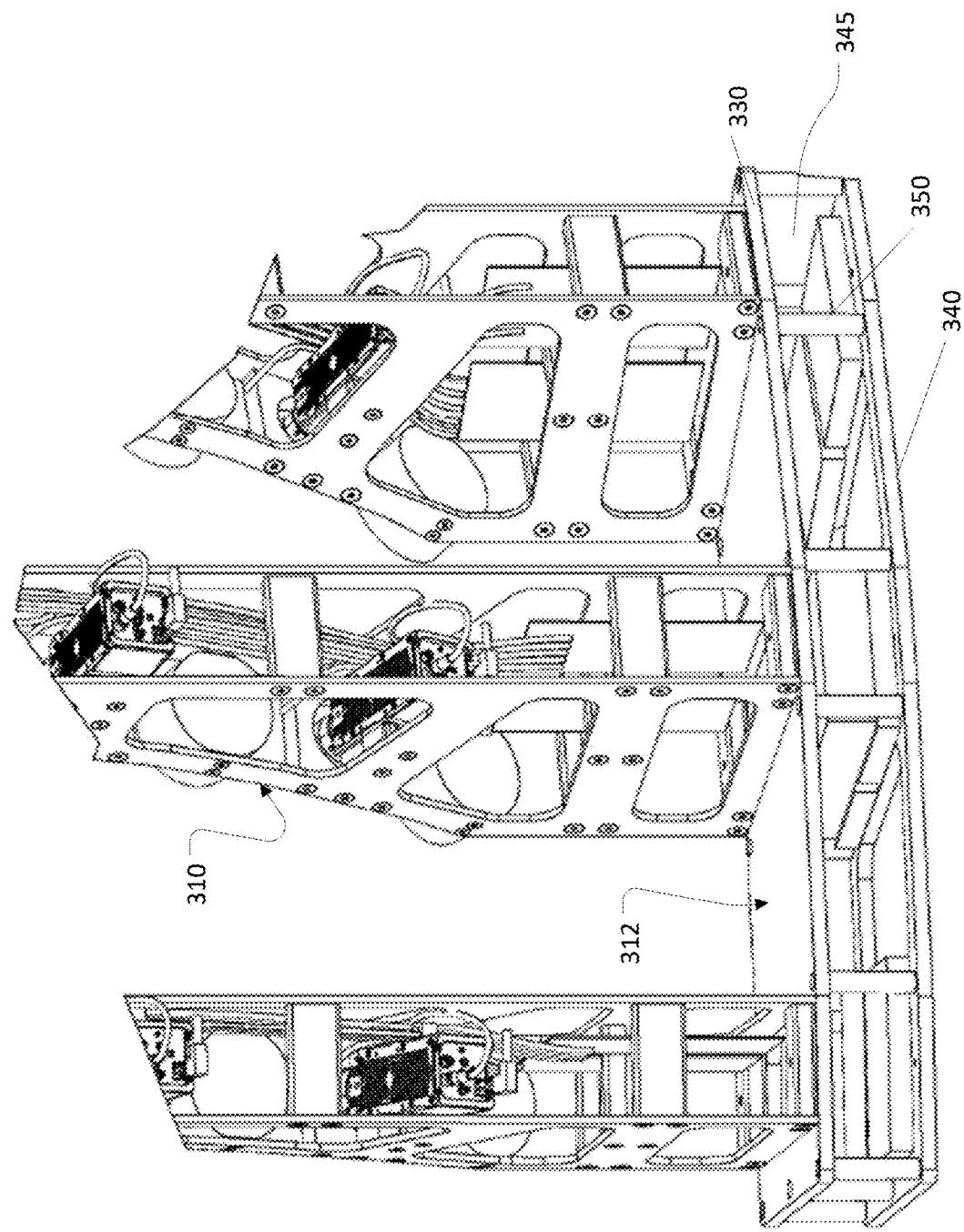
FIG. 7C is an enlarged perspective view illustrating the rig segment base supporting camera triggers and a network switch.
Figure 8:
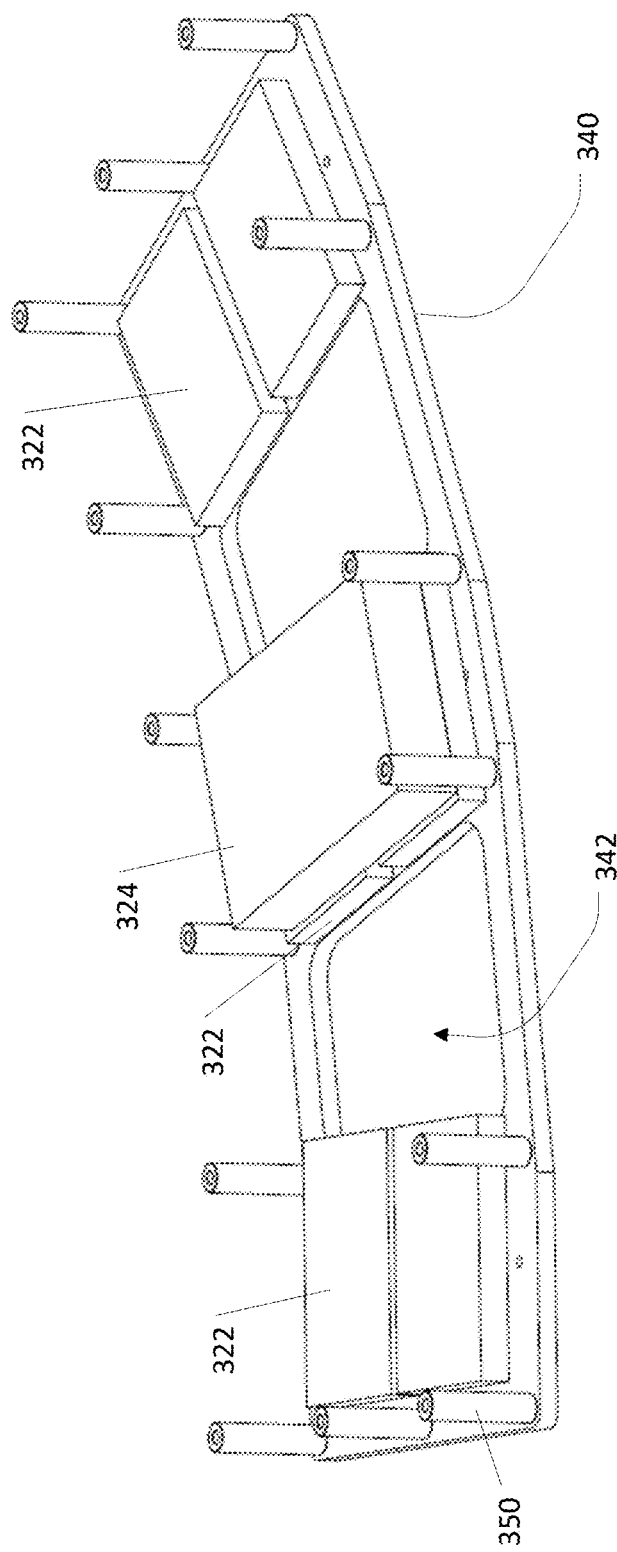
FIG. 8 is a perspective view illustrating a lower frame of the rig segment base.

FIG. 6 illustrates an example of lighting modules and camera modules that are mounted to the mounting tracks. FIG. 7A illustrates an example of a single mounting track including lighting modules and camera modules. FIG. 7B illustrates the single mounting track and an example arrangement of cables and circuit boards. FIG. 7C illustrates the rig segment base supporting camera triggers and a network switch. FIG. 8 illustrates a lower frame of the rig segment base.

Referring to FIG. 6, the mounting track 310 accommodates the lighting modules 110 and the camera modules 120 that are arranged alternately along the curved shape of the mounting track 310. The arrangements of the lighting modules 110 and the camera modules 120 can define specific scanning environment in the imaging space 102 such as brightness, and a directional variation of the brightness, image capturing sequence/timing, imaging angles, etc. For example, in some implementations, the lighting modules 110 can be configured to provide constant or uniform lighting, where all of the light modules 110 illuminate light with the same brightness at a time. In some implementations, the lighting modules 110 can be configured to provide gradient lighting, where a first portion of the light modules 110 disposed at a first side of the rig are brighter than a second portion of the light modules 110 disposed at a second side of the rig. In some cases, the brightness of the second portion of the light modules 110 can fall off to zero.

In some implementations, each modular rig segment 300 can form a curved portion of the spherical structure of the scanning system 100 and interconnect with adjacent rig segments 300 using precision-matched keyways and toggle clamps. The rig segments 300 can be used individually or in combination, ranging from a single unit for partial coverage to a full set for a complete spherical enclosure, providing flexibility for various scanning environments.

In some examples, the rig segments 300 can be geometrically shaped using spherical lune profiles, ensuring that when assembled, they can maintain symmetry around the central axis AX. In some cases, the scanning system 100 can include structural rails or geodesic panels for mounting lighting and camera modules, along with internal compartments 345 that accommodate trigger controllers 322, network switches 324, and power distribution hardware.

Each rig segment 300 can lock securely into place with adjacent rig segments and the base platform 400, enabling rapid setup and teardown while preserving consistent alignment and device positioning. This design can support both stationary and portable deployment, making the scanning system 100 suitable for scanning on-location or in controlled environments.

The scanning system 100 can include a structural rail that includes the mounting track system 310 configured to hold camera modules 120 and lighting modules 110 at fixed, repeatable positions. The layout can provide consistent calibration across deployments. In some examples, cables for power, data, and triggers can be routed internally through dedicated channels, reducing clutter and preventing signal interference. At a lower portion of the mounting track 310, printed circuit boards (PCBs) 314 and 316 are provided to distribute power to cameras and lights, simplifying setup and maintenance.

For example, referring to FIG. 7B, each rig segment 300 or mounting track 310 can include a plurality of power cables 318/320 that are connected to the plurality of lighting modules 110 or the plurality of camera modules 120, a plurality of data cables that are connected to the plurality of camera modules 120, and a plurality of cable routing channels 319 configured to cover and guide the plurality of power cables and the plurality of data cables.

In some implementations, to ensure safe transport of the scanning system 100, a specialized dummy insert can be placed in each camera mount location. These inserts can be precision-machined to the same dimensions as the actual camera mounts and include connector plugs for data, power, and trigger interfaces. This design can prevent or reduce damage to delicate cabling and connectors during shipping or rig reconfiguration. When inserted, the inserts can occupy the same mechanical footprint as the camera modules, providing strain relief and shielding for all sensitive wiring, thereby preserving system integrity and reducing the risk of failure or setup delays upon arrival.

In some implementations, each mounting track 310 can include an inner surface that faces the imaging space and an outer surface disposed radially outside of the inner surface, where the outer surface has (i) a vertical section that extends vertically relative to the base platform and (ii) a curved section that extends upward from the vertical section and is curved radially inward relative to the vertical section. For example, the mounting track 310 can include an outer vertical portion 311, an outer curved portion 313 disposed above the outer vertical portion 311, an inner vertical portion 315, and an inner curved portion 317 that is disposed above the inner vertical portion 315 and faces the imaging space 102. In some examples, the height H4 of the inner vertical portion 315 can be less than the height H3 of the outer vertical portion 311, thereby increasing a capacity of the imaging space 102 and define the spherical shape thereof.

In some examples, referring to FIGS. 7C and 8, the rig segment base 312 (the sub-base rig segment) can be located under the mounting tracks 310 and accommodate internal electronics, including trigger distribution boards 322 and network switches 324 in the internal compartment 345. The rig segment base 312 can be structurally integrated into each rig segment (i.e., each rig segment 300), enabling distributed control and communication across the scanning system 100 while keeping external cabling minimal. In some implementations, the rig segment base 312 can include a top plate 330 in contact with the mounting tracks 310, a bottom plate 340 spaced apart from the top plate 330, and posts 350 disposed between the top plate 330 and the bottom plate 340, where the internal compartment 345 is defined.

In some cases, the internal electronics such as trigger distribution boards 322 and network switches 324 can be provided in a sealed compartment to provide protection during transport and simplify deployment in modular scanning environments. In some examples, the system can support connection to external batteries or onboard racks, allowing off-grid operation without reliance on house power.

In some examples, each rig segment 300 can include the power distribution circuit boards 314 and 316, which are configured to provide power to the plurality of lighting modules 110 and the plurality of camera modules 120, respectively. Each rig segment 300 can further include a data storage configured to store image data captured by the plurality of camera modules 120. The camera trigger controller 322 can be configured to control image capture of the plurality of camera modules 120, and the network interface circuit 324 can be configured to communicate with power distribution circuit, camera trigger controller, and the data storage unit.

In some examples, the scanning system 100 can include one or more connectors configured to couple the rig segments 300 to one another. For instance, the connectors can include at least one of a bracket (e.g., top bracket 106 in FIG. 1), a toggle clamp 420 (see FIG. 12A), or a key-slot coupling (e.g., recess 3108 in FIG. 6).

Figure 9A:
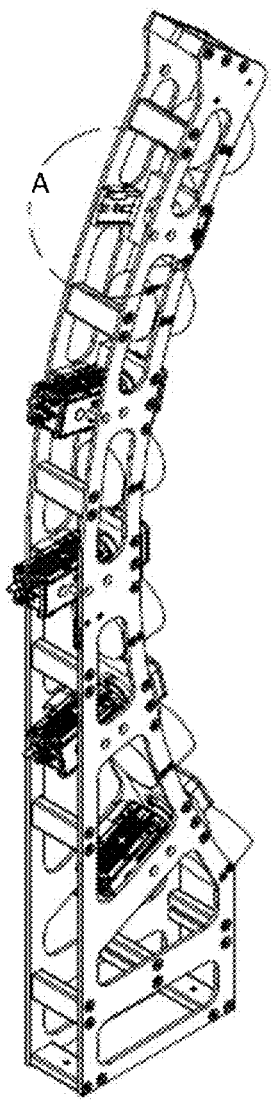
FIGS. 9A and 9B are perspective views showing an example of a camera slot defined in the mounting track.
Figure 9B:
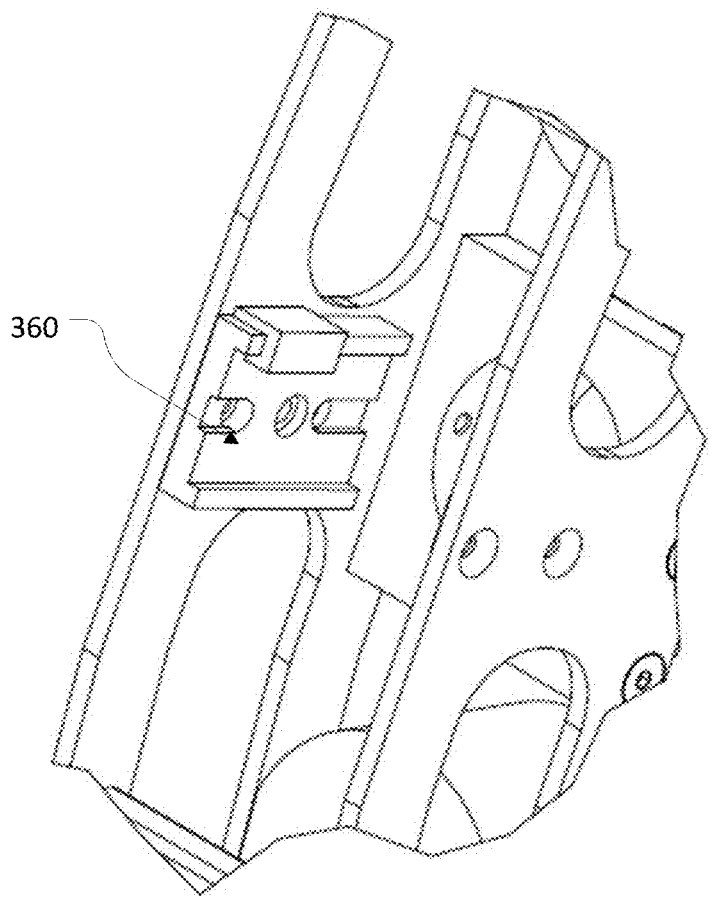

FIGS. 9A and 9B illustrate an example of a camera slot defined in the mounting track. FIG. 9B is an enlarged view of portion A of FIG. 9A.

In some implementations, each of the mounting tracks 310 can include a mounting bracket configured to couple to one of the plurality of camera modules 120, where the mounting bracket includes a rail slot configured to guide movement of the one of the plurality of camera modules 120 based on the one of the plurality of camera modules 120 being mounted to the mounting bracket. For example, the mounting tracks 310 can define a plurality of rails that are configured to receive the camera modules 120 or the lighting modules 110, respectively, and that extend toward the imaging space. Referring to FIGS. 9A and 9B, the mounting track 310 can include camera slots 360 that define the rails, each of which is configured to accommodate one camera module 120 based on the camera module 120 linearly inserting into the camera slot 360.

In some examples, each camera mount can include a custom-machined locking clamp mechanism designed for repeatable positioning. The mounting track 310 can include a mechanical stopping point that ensures camera modules return to the exact same location every time they are removed and reinstalled, thereby maintaining precise alignment in multi-camera scanning environments.

In some examples, a modular mounting bracket can be provided to support multiple camera platforms, including digital single-lens reflex (DSLR) cameras, machine vision cameras, and professional cinema cameras. The modular mounting bracket can allow for quick camera interchangeability without recalibration. In some examples, a locking mechanism can engage via a sliding rail interface, with machined detents and a set screw to prevent slippage under vibration or heavy use.

Figures 10A, 10B:
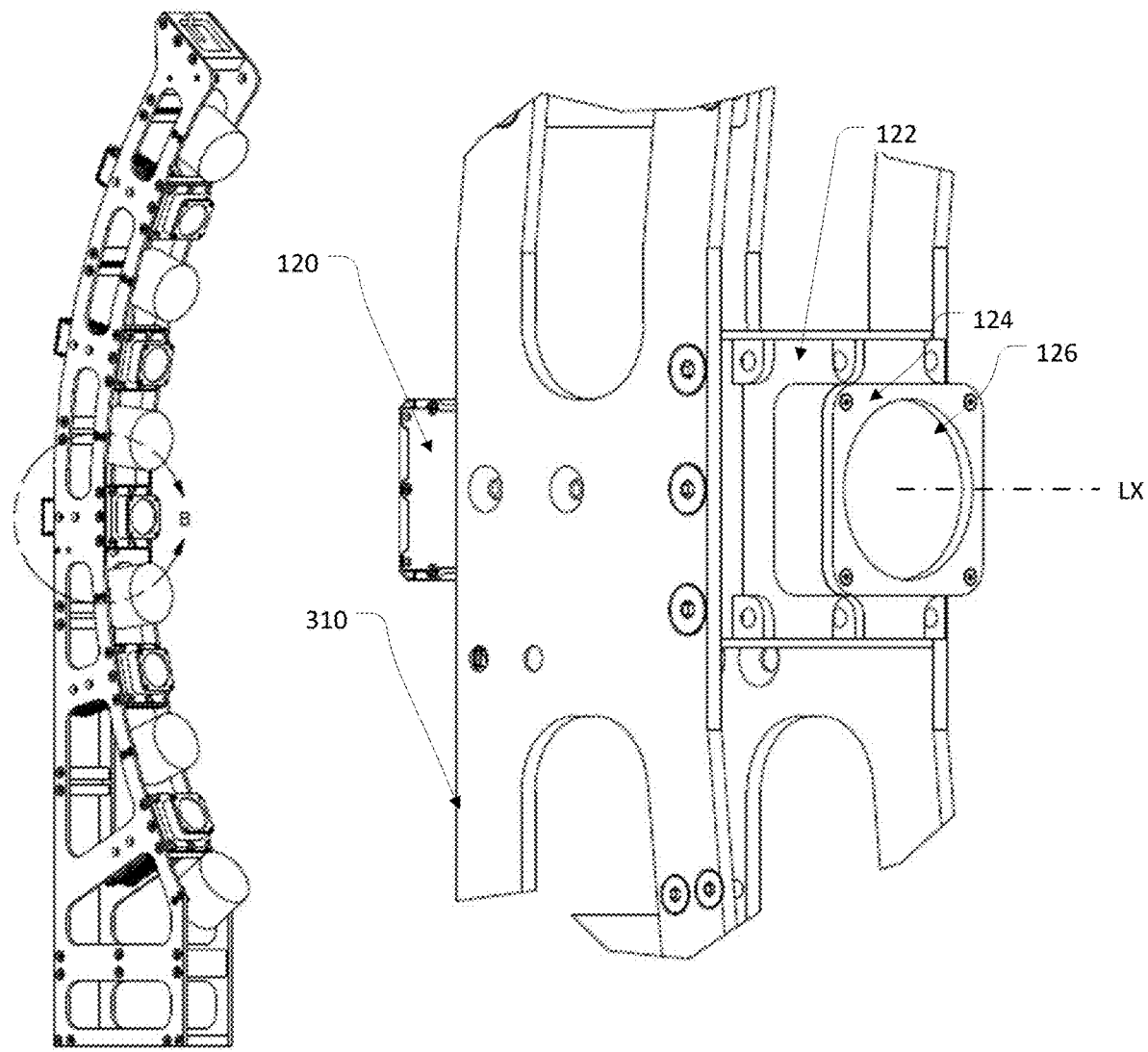
FIGS. 10A and 10B are perspective views showing an example of a camera and a mounting bracket that are installed at the mounting track.

FIGS. 10A and 10B illustrate an example of a camera and a mounting bracket that are installed at the mounting track. FIG. 10B is an enlarged view of portion B of FIG. 10A.

In some implementations, the mounting track 310 can include a polarizer holder 122 that is coupled to at least one of the plurality of mounting tracks 310, where the polarizer holder 122 is disposed at a lens side of one of the plurality of camera modules 120 facing the imaging space 102. The mounting track 310 further includes a polarizer 126 mounted to the polarizer holder 122 and disposed in a preset polarization orientation with respect to a lens axis LX of each of the plurality of camera modules 120. For instance, the preset polarization orientation of the polarizer 126 can be provided by a keyed coupling between the polarizer 126 and the polarizer holder 122. For example, the polarizer 126 can have a recess at a side, and the polarizer holder 122 can have a mating protrusion configured to insert into the recess of the polarizer 126. In some cases, the polarizer holder 122 can include a polarizer cover 124 that fixes the polarizer 126 to the polarizer holder 122 and covers the keyed-coupling of the polarizer 126 and the polarizer holder 122.

The polarizer holder 122 can be a precision-machined holder designed to house a circular or square polarizing filter within a 3D/4D capture rig. The polarizer holder 122 can be mounted directly onto the structural surface of the scanning system 100, independent of the camera body, allowing the filter's polarization axis to remain aligned with the global orientation of the rig's spherical coordinate system. By decoupling the polarizer 126 from the camera 120 itself, this design can eliminate the need to recalibrate or realign the filter each time a camera is removed or reinstalled. The polarizer 126 can remain in a fixed, repeatable orientation relative to the sphere, ensuring consistent polarization behavior across all views and sessions.

In some implementations, the camera 120 can be positioned behind the polarizer holder 122, allowing it to capture light that has already passed through the fixed polarizer 126. This ensures uniform polarization filtering across all capture nodes, which can provide photometric consistency in shape-from—shading, multi-flash, or reflectance capture workflows.

Figure 11:
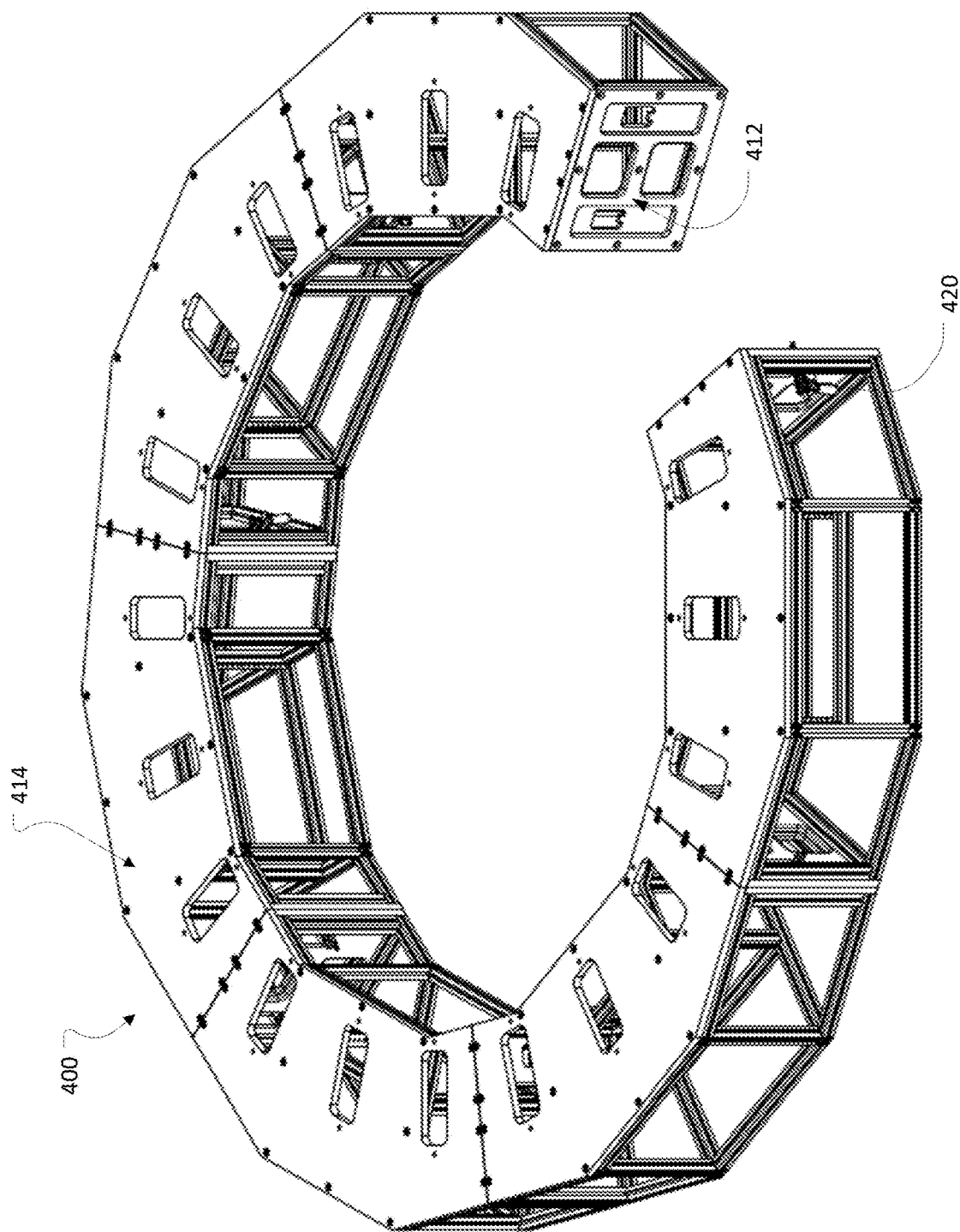
FIG. 11 is a perspective view showing an example of the base platforms that are coupled to one another and define a circular shape.
Figure 12A:
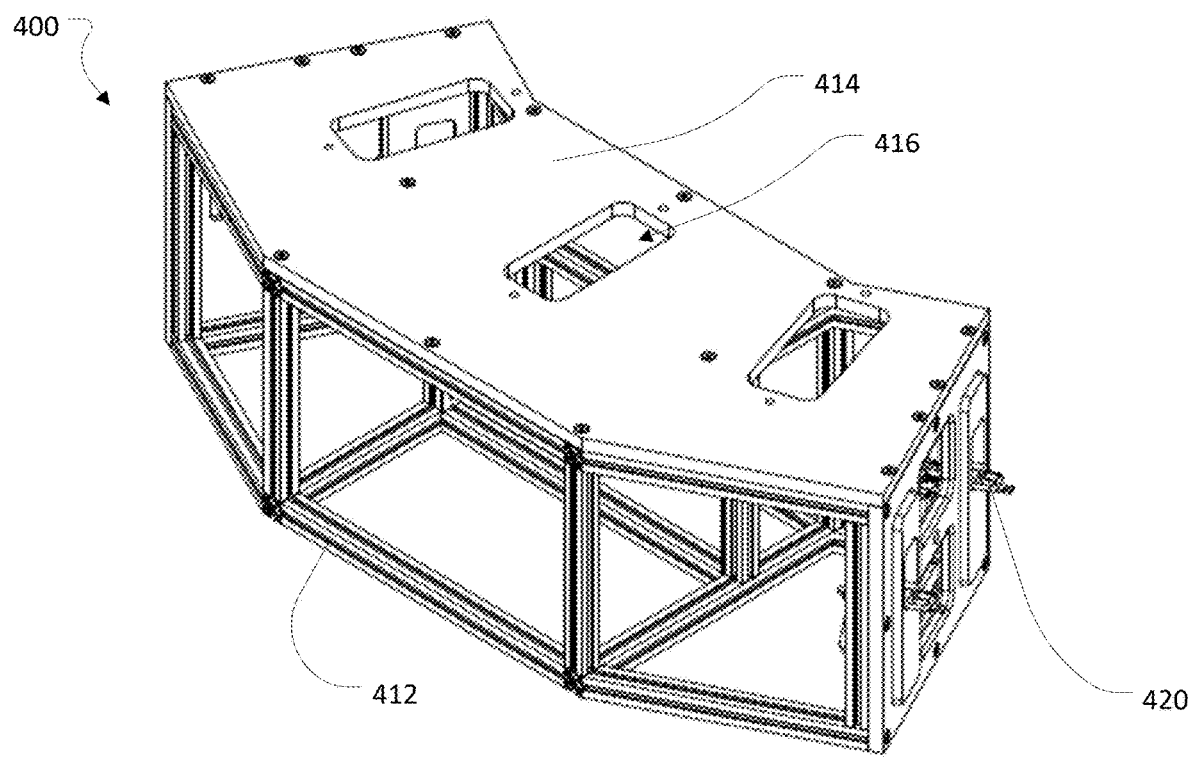
FIGS. 12A and 12B are a perspective view and a top view of the base platform, respectively.
Figure 12B:
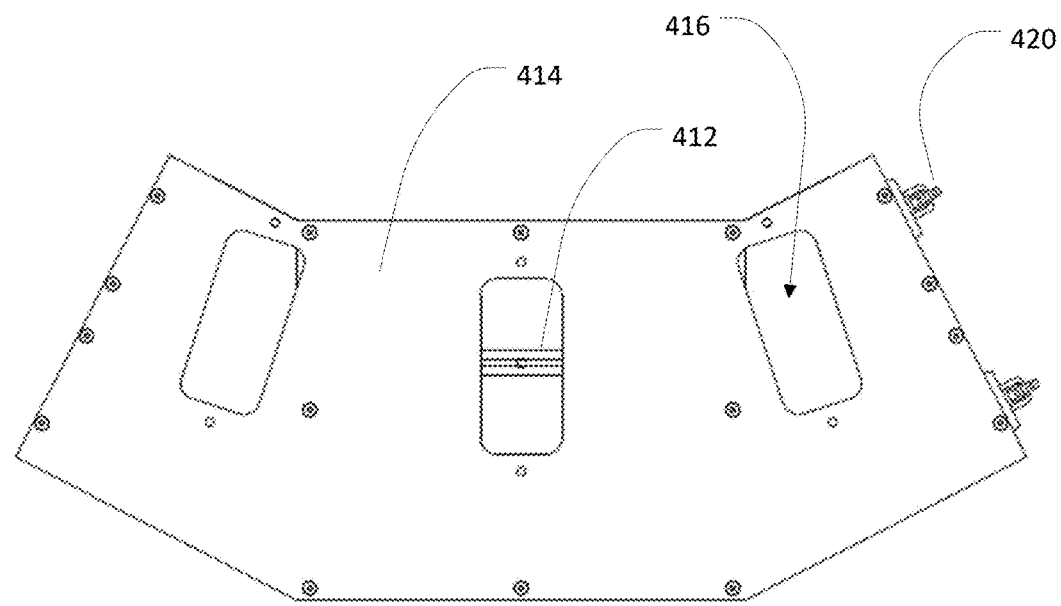
Figure 13:
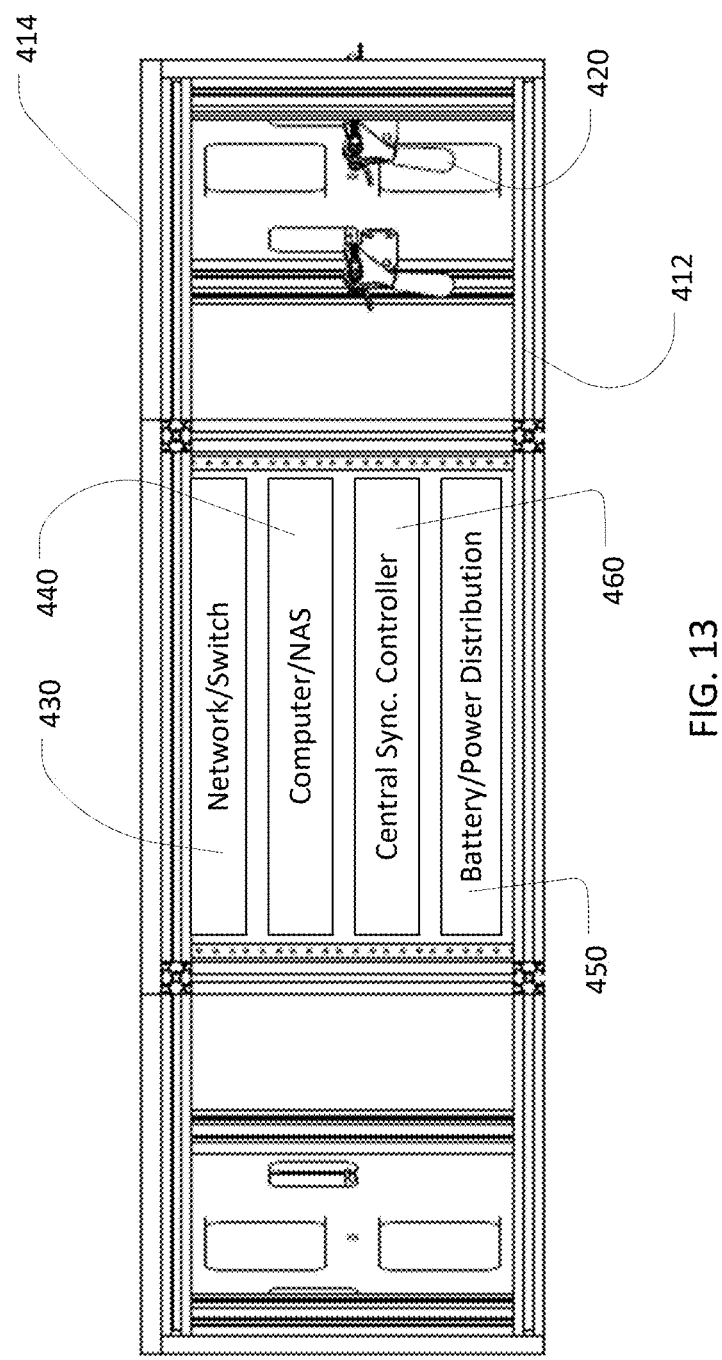
FIG. 13 is a view illustrating an example arrangement of electronic components and clamps in the base platform.

FIG. 11 illustrates an example of the base platforms that are coupled to one another and define a circular shape. FIGS. 12A and 12B illustrate the base platform. FIG. 13 illustrates an example arrangement of electronic components and clamps in the base platform.

In some implementations, the base platform 400 can include an upper plate 414 that supports the rig segment 300, a base frame 412 disposed below the upper plate 414, and a toggle clamp 420 disposed at a side surface of the base frame 412 and configured to connect to a base platform 400 of another rig segment of the plurality of rig segments. In some examples, the upper plate 414 can define a plurality of cutouts 416 corresponding to positions of the plurality of mounting tracks 310. In some cases, the cutouts 416 can expose at least a portion of the base frame 412. The toggle clamp 420 can protrude from the side surface of the base frame 412.

In some cases, the toggle clamp 420 can be a horizontally oriented right-angle latch toggle clamp positioned on both left and right sides of each base platform 400. The toggle clamp 420 can provide secure attachment points for locking lower rig segments to the base structure. As with the upper rig segment clamps, this mechanism can support tool-less locking, ensuring that the scanning system 100 can be quickly set up or packed down.

Referring to FIG. 11, as described above, the base platforms 400 can be circumferentially arranged about the center axis AX. The base platforms 400 can provide foundational support for all segments and equipment in the scanning system 100. The base platforms 400 can be coupled to one another via a circular rail system with precision-machined keyed sockets spaced along its perimeter. The sockets can serve as anchor points for vertical segment assemblies, ensuring precise alignment and repeatable positioning during setup.

In some examples, referring to FIG. 13, the base frame 412 can define a space for accommodating electronic devices. For instance, the base frame 412 can accommodate a network switch 430, a computer, and a network attached storage (NAS) 440, a battery or power distribution circuit or device 450, and a central synchronization controller 460. The base frame 412 can provide a dedicated rack-mount chassis integrated into the base platform 400, providing secure compartments for network switches, edge computing servers, battery arrays, and power distribution units. This enclosure can allow the scanning system 100 to operate independently of external infrastructure, eliminating reliance on house power, and enabling rapid setup in remote or mobile environments. It can also support onboard storage and triggering systems, making it an all-in-one portable capture solution.

In some implementations, the central synchronization controller 460 can be configured to coordinate image capture timing and data aggregation of the plurality of camera modules 120. For instance, the central synchronization controller 460 can include one or more processors, electric circuits, time code generators, etc.

Figure 14:
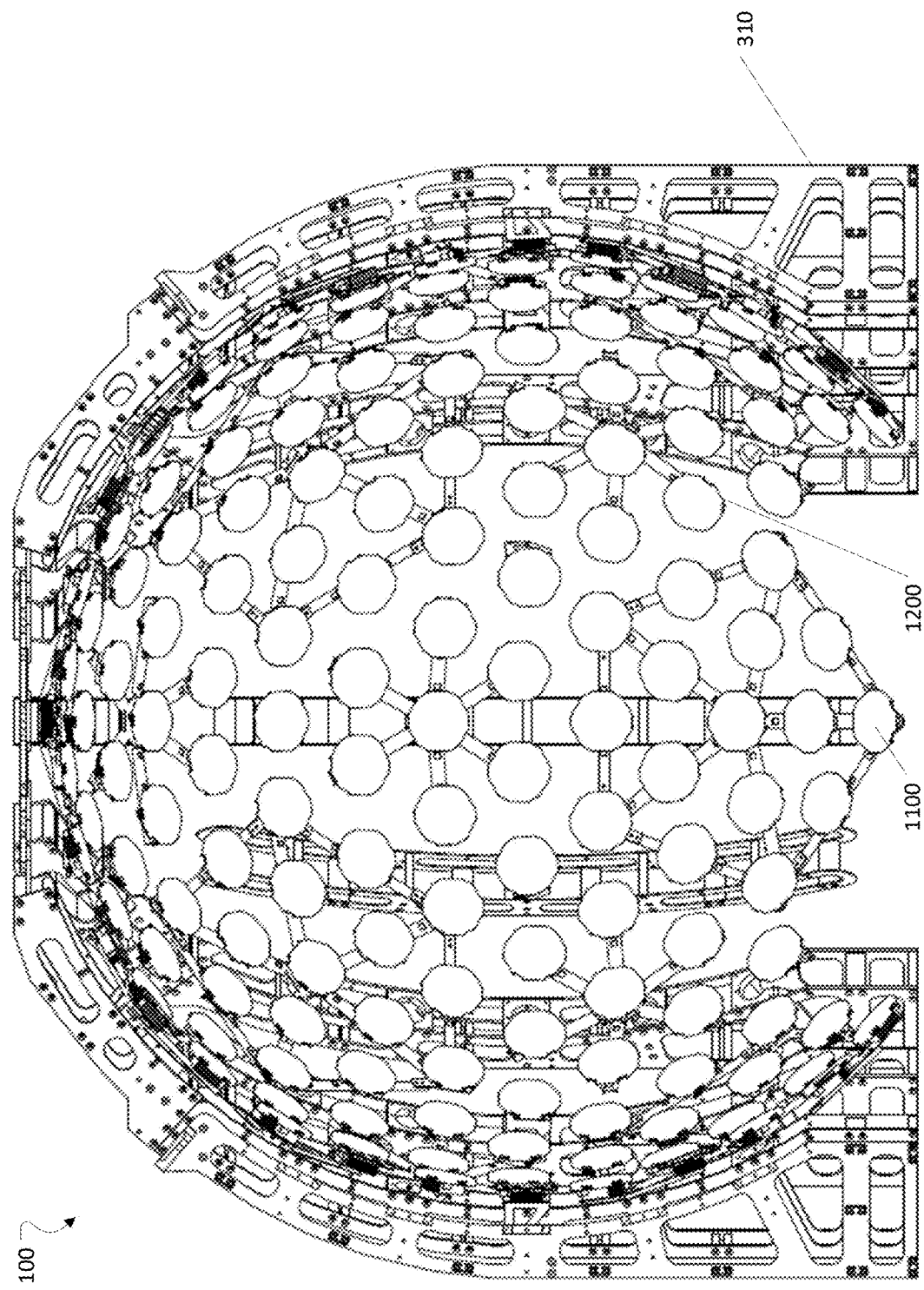
FIG. 14 is a perspective view illustrating an example arrangement of light panels at the spherical scanning rig.
Figure 15B:
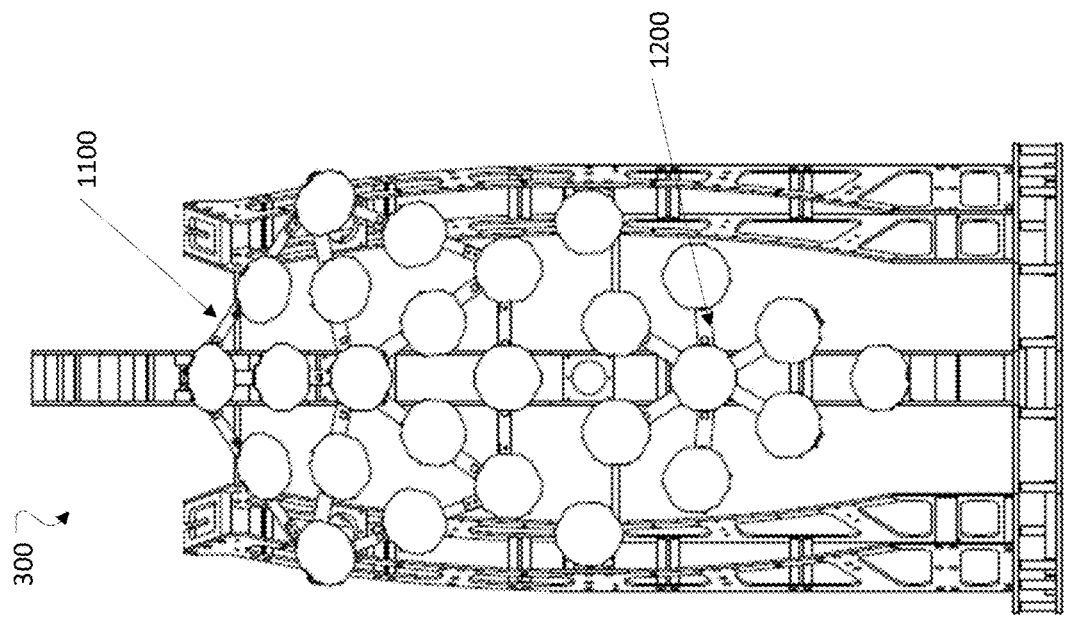
FIGS. 15A and 15B are views illustrating example arrangements of the light panels at one rig segment.
Figure 15A:
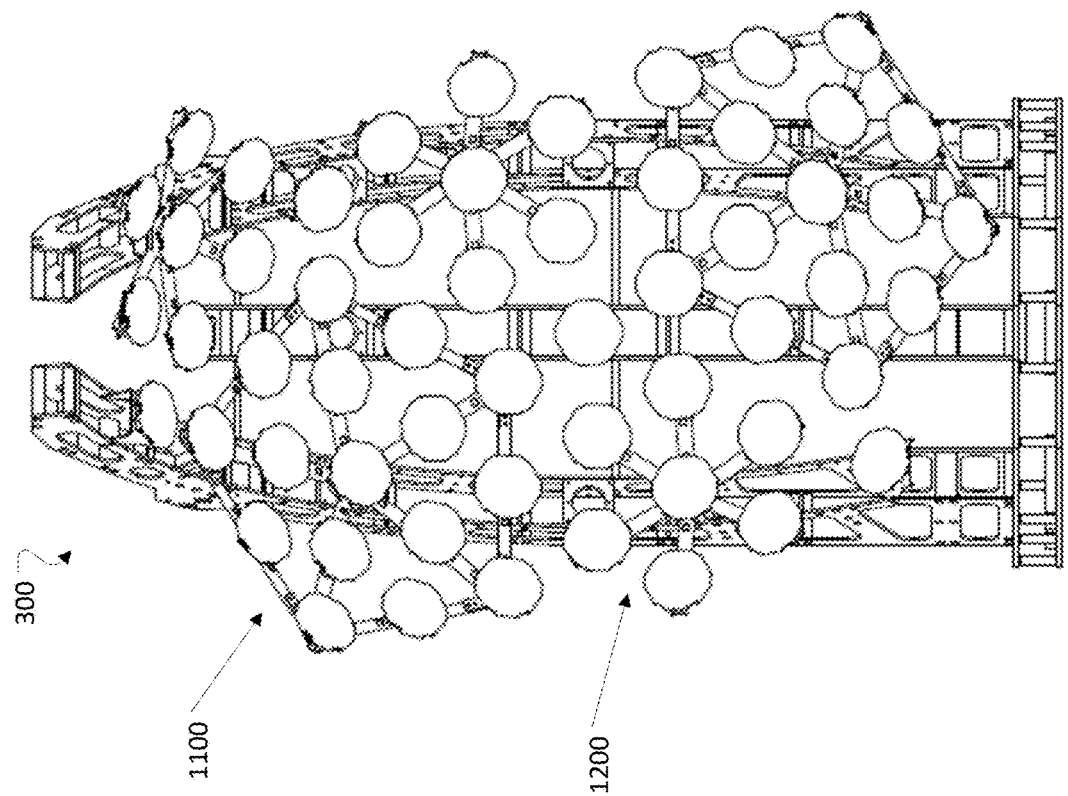
Figure 16B:
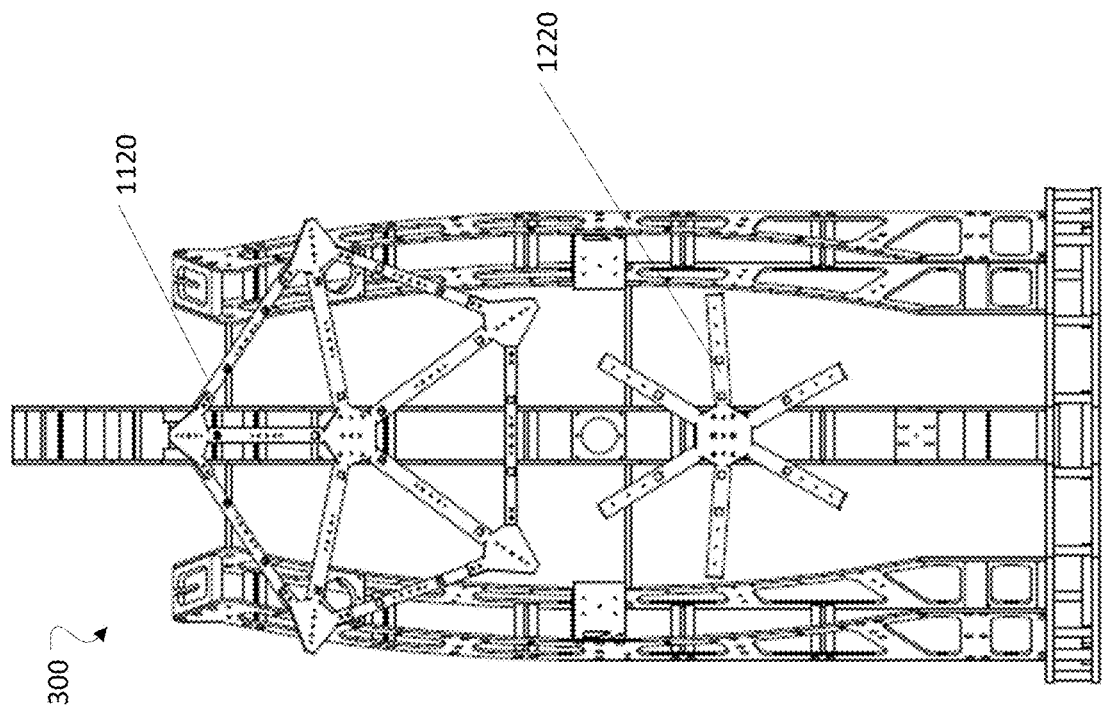
FIGS. 16A and 16B are views illustrating examples of light mounts without lighting modules.
Figure 16A:
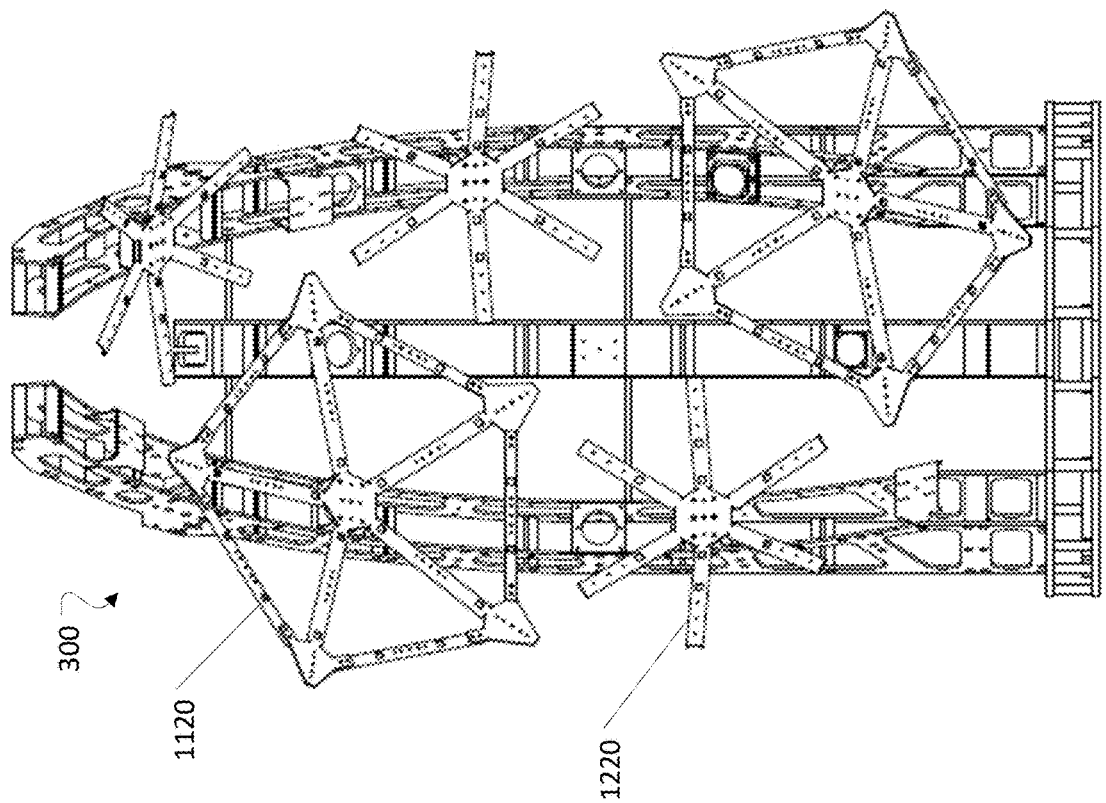
Figure 17B:
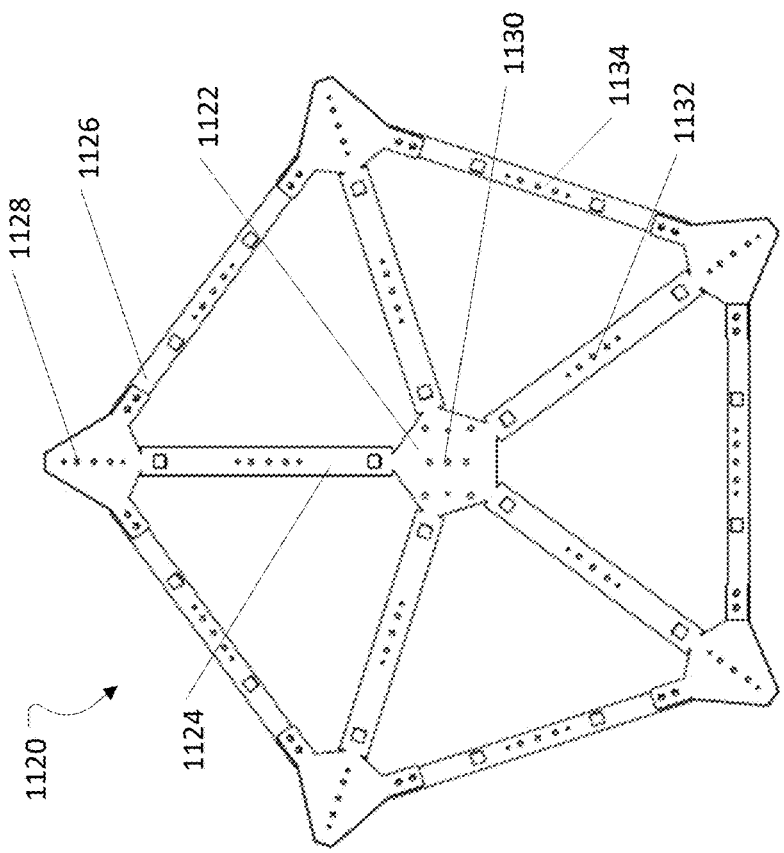
FIGS. 17A and 17B are views illustrating an example of a light panel including 16 lighting modules and a light mount.
Figure 17A:
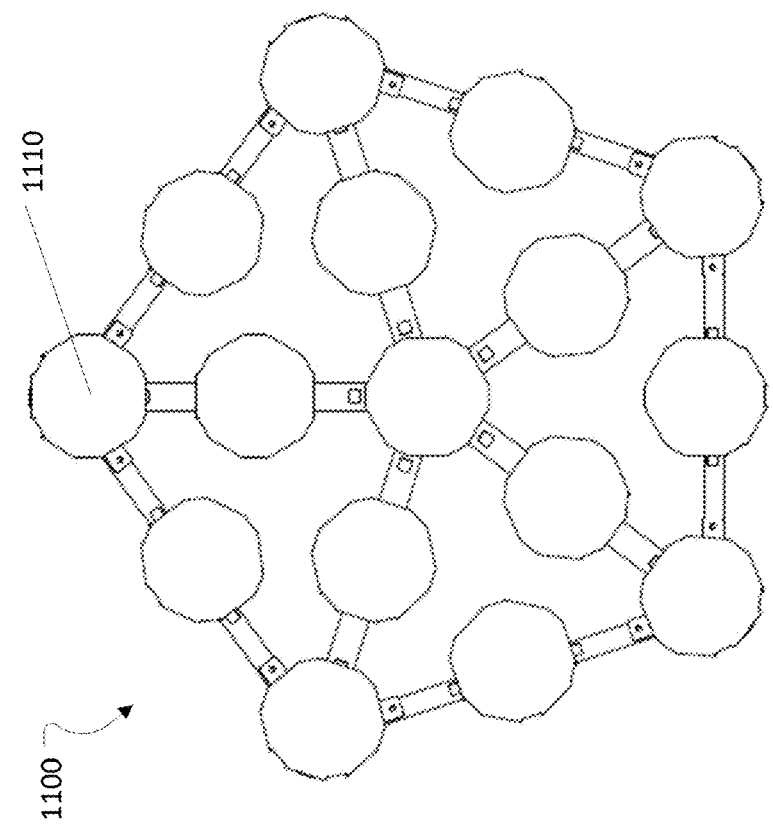
Figure 18B:
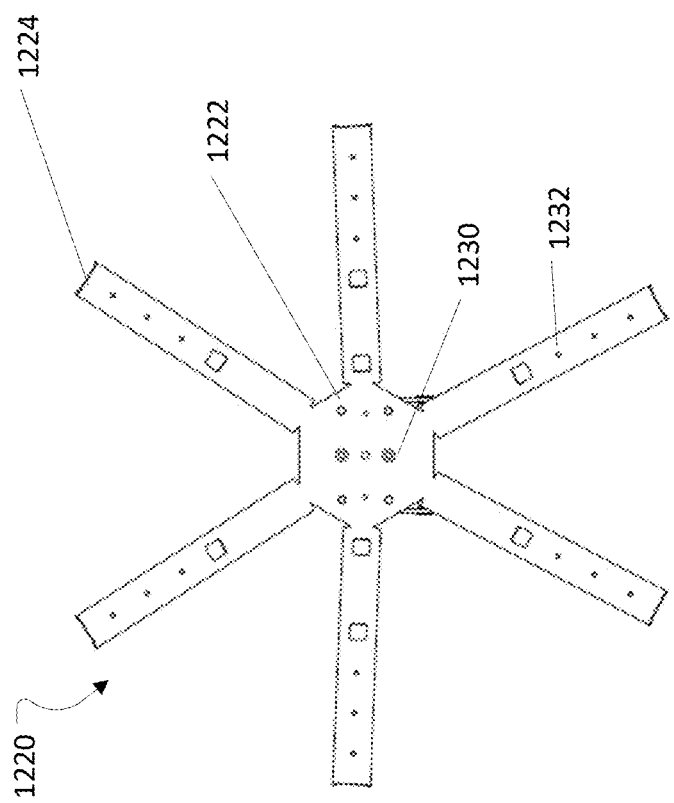
FIGS. 18A and 18B are views illustrating an example of a light panel including 7 lighting modules and a light mount.
Figure 18A:
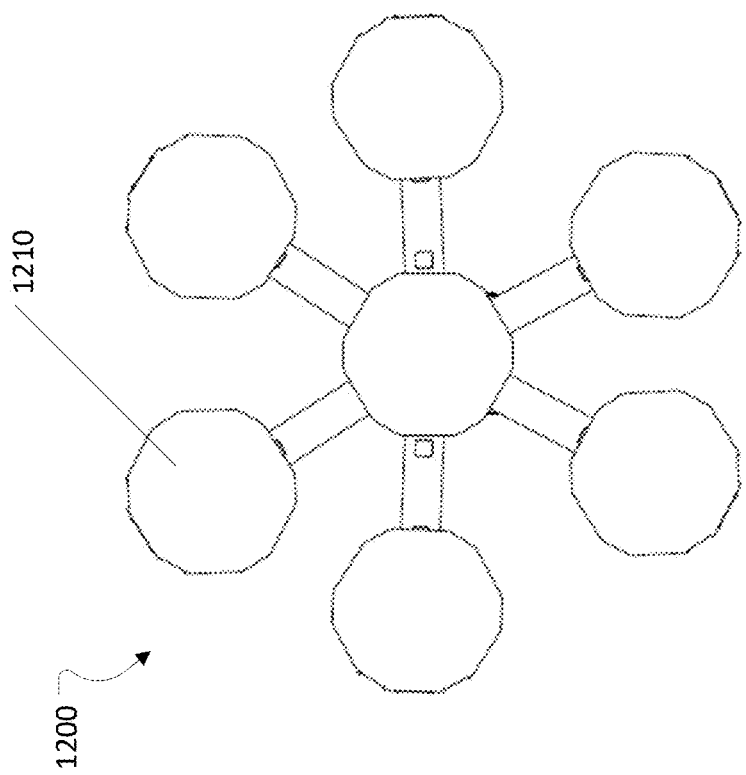

FIG. 14 illustrates an example arrangement of light panels at the spherical scanning rig. FIGS. 15A and 15B illustrate example arrangements of the light panels at one rig segment. FIGS. 16A and 16B illustrate examples of light mounts. FIGS. 17A and 17B illustrate an example of a light panel including 16 lighting modules and a light mount. FIGS. 18A and 18B illustrate an example of a light panel including 7 lighting modules and a light mount.

In some implementations, the spherical scanning system 100 can further include lighting panels 1100 and 1200 coupled to at least one of the plurality of the mounting tracks 310, where the plurality of lighting modules 1110 and 1210 are mounted to the lighting panel. Each lighting panel 1100 and 1200 can be precision-engineered to represent part of a geodesic dome, forming a symmetrical spherical structure when assembled. The lighting panels can follow geodesic coordinate geometry and be configured to interlock seamlessly at specific angles, ensuring a rigid and stable enclosure. Mounting points for lighting modules can be integrated into the lighting panel faces, aligned according to the geodesic layout. This geometric consistency can provide uniform coverage and repeatable device positioning across the spherical volume. The lighting panels are lightweight yet durable, allowing for quick assembly and disassembly. As shown in FIGS. 14 to 16B, for example, when combined and coupled to the rig segments 300, the lighting panels 1100 and 1200 can form a hemisphere or full sphere, depending on the number of rig segments used, with high structural integrity around the central axis AX.

Referring to FIGS. 17A and 17B, the lighting panel 1100 can include a light mount 1120 and 16 lighting modules 1110 mounted to the light mount 1120, for instance. The light mount 1120 can include a hub 1112 and a plurality of arms 1124 that extend radially outward from the hub 1122, where the lighting modules 1110 can be mounted to the hub 1122 and end points of the plurality of arms 1124. The light mount 1120 can further include a plurality of connection bars 1126 that connect the end points of the plurality of arms 1124, where the plurality of lighting modules 1110 can be further mounted to (i) each of the plurality of connection bars 1126 between the end points of the plurality of arms 1124 and (ii) a midpoint of each of the plurality of arms 1124 between the hub 1122 and one of the end points of the plurality of arms 1124. Each lighting module 1110 can include a light source such as one or more LEDs.

In some examples, referring to FIGS. 18A and 18B, the lighting panel 1200 can include a light mount 1220 and 7 lighting modules 1210 mounted to the light mount 1220. The light mount 1220 can include a hub 1222 and a plurality of arms 1224 that extend radially outward from the hub 1222, where the lighting modules 1210 can be mounted to the hub 1222 and end points of the plurality of arms 1224. In some examples, each arm 1224 can include predetermined mounting points 1232 between the hub 1222 and the end point of the arm 1224. Each lighting module 1210 can include a light source such as one or more LEDs.

Although a few implementations have been described in detail above, other modifications may be made without departing from the scope of the inventive concepts described herein, and, accordingly, other implementations are within the scope of the following claims.

What is claimed is:

1. A spherical scanning system, comprising:
a plurality of rig segments configured to be arranged circumferentially about a central axis and to define an imaging space having a spherical shape, wherein the plurality of rig segments are configured to define at least one entrance to provide access to the imaging space,
wherein each of the plurality of rig segments comprises:
a base platform,
a plurality of mounting tracks that extend upward from the base platform and are connected to one another, each of the plurality of mounting tracks being curved to define a portion of the spherical shape,
a plurality of lighting modules disposed at each of the plurality of mounting tracks, and
a plurality of camera modules mounted to each of the plurality of mounting tracks,
wherein the plurality of rig segments are configured to be disassembled from one another for transportation,
wherein the base platform comprises:
an upper plate that supports the plurality of mounting tracks,
a base frame disposed below the upper plate, and
a clamp disposed at a side surface of the base frame and configured to lock the base frame relative to a base platform of another rig segment of the plurality of rig segments, and
wherein the base frame defines a space configured to accommodate electronic devices.

2. The spherical scanning system of claim 1, further comprising:
a plurality of connectors configured to couple the plurality of rig segments to one another.

3. The spherical scanning system of claim 2, wherein the plurality of connectors comprise at least one of a toggle clamp or a key-slot coupling.

4. The spherical scanning system of claim 1, wherein each of the plurality of mounting tracks define a plurality of rails that are configured to receive the plurality of lighting modules, respectively, and that extend toward the imaging space.

5. The spherical scanning system of claim 1, further comprising a lighting panel coupled to at least one of the plurality of the mounting tracks,
wherein the plurality of lighting modules are mounted to the lighting panel.

6. The spherical scanning system of claim 5, wherein the lighting panel comprises a hub and a plurality of arms that extend radially outward from the hub, and
wherein the plurality of lighting modules are mounted to the hub and end points of the plurality of arms.

7. The spherical scanning system of claim 6, wherein the lighting panel further comprises a plurality of connection bars that connect the end points of the plurality of arms,
wherein the plurality of lighting modules are further mounted to (i) each of the plurality of connection bars between the end points of the plurality of arms and (ii) a midpoint of each of the plurality of arms between the hub and one of the end points of the plurality of arms.

8. The spherical scanning system of claim 1, wherein the plurality of rig segments are arranged along geodesic coordinates of the spherical shape.

9. The spherical scanning system of claim 1, wherein each of the plurality of mounting tracks comprises a mounting bracket configured to couple to one of the plurality of camera modules, the mounting bracket defining a rail slot configured to guide movement of the one of the plurality of camera modules based on the one of the plurality of camera modules being mounted to the mounting bracket.

10. The spherical scanning system of claim 1, wherein each of the plurality of rig segments further comprises:
a plurality of power cables that are connected to the plurality of lighting modules or the plurality of camera modules;
a plurality of data cables that are connected to the plurality of camera modules; and a plurality of cable routing channels configured to cover and guide the plurality of power cables and the plurality of data cables.

11. The spherical scanning system of claim 1, wherein the plurality of rig segments are made of at least one of aluminum, carbon composite materials, or plastics.

12. The spherical scanning system of claim 1, further comprising a central synchronization controller configured to coordinate image capture timing and data aggregation of the plurality of camera modules.

13. The spherical scanning system of claim 1, wherein each of the plurality of rig segments further comprises:
　a polarizer holder that is coupled to at least one of the plurality of mounting tracks, the polarizer holder being disposed at a lens side of one of the plurality of camera modules facing the imaging space; and
　a polarizer mounted to the polarizer holder and disposed in a preset polarization orientation with respect to a lens axis of each of the plurality of camera modules.

14. The spherical scanning system of claim 1, further comprising:
　a top bracket that couples upper ends of the plurality of mounting tracks to one another.

15. The spherical scanning system of claim 1, wherein each of the plurality of rig segments further comprises at least one bridge that is disposed between an upper end and a lower end of the plurality of mounting tracks and circumferentially connects the plurality of mounting tracks.

16. The spherical scanning system of claim 1, wherein the upper plate defines a plurality of cutouts corresponding to positions of the plurality of mounting tracks.

17. The spherical scanning system of claim 1, wherein the electronic devices in the base frame comprise at least one of:
　a power distribution circuit configured to provide power to the plurality of lighting modules and the plurality of camera modules;
　a camera trigger controller configured to control image capture of the plurality of camera modules;
　a data storage configured to store image data captured by the plurality of camera modules; or
　a network interface circuit configured to communicate with power distribution circuit, camera trigger controller, and the data storage.

18. The spherical scanning system of claim 1, wherein each of the plurality of mounting tracks comprises:
　an inner surface that faces the imaging space; and
　an outer surface disposed radially outside of the inner surface, the outer surface having (i) a vertical section that extends vertically relative to the base platform and (ii) a curved section that extends upward from the vertical section and is curved radially inward relative to the vertical section.

* * * * *